United States Patent
Aher et al.

(10) Patent No.: US 12,056,179 B2
(45) Date of Patent: Aug. 6, 2024

(54) SYSTEMS AND METHODS FOR GENERATING QUERY SUGGESTIONS

(71) Applicant: Rovi Guides, Inc., San Jose, CA (US)

(72) Inventors: Ankur Anil Aher, Maharashtra (IN); Jeffry Copps, Chennai (IN); Debarghya Banerjee, Bangalore (IN); Harish Ashok Kumar, Chennai (IN); Princy Goel, Bangalore (IN)

(73) Assignee: Rovi Guides, Inc., San Jose, CA (US)

(*) Notice: Subject to any disclaimer, the term of this patent is extended or adjusted under 35 U.S.C. 154(b) by 125 days.

(21) Appl. No.: 16/142,209

(22) Filed: Sep. 26, 2018

(65) Prior Publication Data

US 2020/0097499 A1    Mar. 26, 2020

(51) Int. Cl.
| | |
|---|---|
| G06F 16/00 | (2019.01) |
| G06F 16/432 | (2019.01) |
| G06F 16/435 | (2019.01) |
| G06F 16/44 | (2019.01) |
| G06F 16/483 | (2019.01) |

(52) U.S. Cl.
CPC .......... G06F 16/483 (2019.01); G06F 16/432 (2019.01); G06F 16/435 (2019.01); G06F 16/444 (2019.01)

(58) Field of Classification Search
CPC .... G06F 16/432; G06F 16/435; G06F 16/444; G06F 16/483
USPC ........................................................ 707/769
See application file for complete search history.

(56) References Cited

U.S. PATENT DOCUMENTS

| | | | | |
|---|---|---|---|---|
| 6,571,239 | B1* | 5/2003 | Cole ..................... | G06F 16/31 |
| | | | | 707/999.005 |
| 7,778,874 | B1* | 8/2010 | Saunders ........... | G06Q 30/0269 |
| | | | | 705/14.66 |
| 8,046,801 | B2 | 10/2011 | Ellis et al. | |
| 8,375,014 | B1* | 2/2013 | Brocato ............... | G06F 16/213 |
| | | | | 707/705 |
| 8,635,520 | B2* | 1/2014 | Christiansen .......... | G06Q 10/10 |
| | | | | 715/230 |
| 8,639,679 | B1* | 1/2014 | Zhou ................ | G06F 16/90324 |
| | | | | 707/706 |
| 9,384,266 | B1* | 7/2016 | Leicht ..................... | G06F 16/35 |
| 10,445,061 | B1* | 10/2019 | Cao ...................... | G06F 16/951 |
| 10,489,459 | B1* | 11/2019 | Jastrzebski ....... | G06F 16/90324 |
| 10,515,133 | B1* | 12/2019 | Sharifi ..................... | G06F 16/48 |
| 11,140,450 | B2* | 10/2021 | Yelton ..................... | G10L 15/22 |

(Continued)

*Primary Examiner* — Mariela Reyes
*Assistant Examiner* — Rezwanul Mahmood
(74) *Attorney, Agent, or Firm* — Haley Guiliano LLP

(57) ABSTRACT

Systems and methods are described herein for generating query suggestions. The method comprising retrieving a plurality of metadata fields associated with a media asset, generating, based on the retrieved plurality of metadata fields, a plurality of combinations of the metadata fields. For each respective combination of the metadata fields of the plurality of combinations, the method searches a database for media assets that comprise metadata fields matching the respective combination of the metadata fields, and calculates a number media assets that match the respective combination based on the searching. The method selects a combination of the metadata fields of the plurality of combinations with a lowest associated calculated number of matching media assets, creates a suggested query based on the selected combination of metadata fields, and outputs the suggested query.

31 Claims, 11 Drawing Sheets

(56) References Cited

U.S. PATENT DOCUMENTS

| | | | |
|---|---|---|---|
| 11,392,632 B1* | 7/2022 | Nelson | G06F 16/438 |
| 2004/0078214 A1* | 4/2004 | Speiser | G06Q 30/0625 |
| | | | 705/347 |
| 2005/0251827 A1 | 11/2005 | Ellis et al. | |
| 2007/0276844 A1* | 11/2007 | Segal | G06F 16/24558 |
| 2009/0106202 A1* | 4/2009 | Mizrahi | G06F 16/48 |
| | | | 707/E17.02 |
| 2010/0318586 A1* | 12/2010 | Wessling | G06F 16/683 |
| | | | 707/769 |
| 2011/0125724 A1* | 5/2011 | Mo | G06F 16/9535 |
| | | | 707/706 |
| 2011/0212430 A1* | 9/2011 | Smithmier | G09B 5/06 |
| | | | 434/322 |
| 2011/0307463 A1* | 12/2011 | Kasterstein | H04L 67/02 |
| | | | 707/706 |
| 2012/0047025 A1* | 2/2012 | Strohman | G06F 16/90324 |
| | | | 705/14.71 |
| 2012/0124071 A1* | 5/2012 | Gebhard | G06F 16/3322 |
| | | | 707/E17.069 |
| 2012/0150901 A1* | 6/2012 | Johnson | G06F 16/9537 |
| | | | 707/769 |
| 2012/0323575 A1* | 12/2012 | Gibbon | G06F 3/167 |
| | | | 704/E17.001 |
| 2013/0041896 A1* | 2/2013 | Ghani | G06F 16/3328 |
| | | | 707/E17.014 |
| 2013/0086509 A1* | 4/2013 | Satyanarayana | G06F 16/3322 |
| | | | 715/781 |
| 2014/0129973 A1* | 5/2014 | Guo | G06F 16/3322 |
| | | | 715/780 |
| 2014/0188926 A1* | 7/2014 | Chandel | G06F 16/435 |
| | | | 707/767 |
| 2014/0201187 A1* | 7/2014 | Larson | G06F 16/31 |
| | | | 707/711 |
| 2015/0058324 A1* | 2/2015 | Kauwe | G06F 16/9535 |
| | | | 707/722 |
| 2015/0066907 A1* | 3/2015 | Somaiya | G06F 16/9535 |
| | | | 707/722 |
| 2015/0254057 A1 | 9/2015 | Klein et al. | |
| 2015/0310526 A1* | 10/2015 | Warren | G06F 16/248 |
| | | | 705/26.62 |
| 2015/0317320 A1* | 11/2015 | Miller | G06F 16/90324 |
| | | | 707/728 |
| 2015/0324435 A1* | 11/2015 | Hsieh | G06F 16/951 |
| | | | 707/767 |
| 2015/0339759 A1* | 11/2015 | Pope | G06Q 30/0631 |
| | | | 705/26.62 |
| 2015/0379048 A1* | 12/2015 | Raghavan | G06F 3/04817 |
| | | | 707/706 |
| 2016/0034542 A1* | 2/2016 | Lamego | G06F 16/2379 |
| | | | 707/723 |
| 2016/0142783 A1* | 5/2016 | Bagga | H04N 21/47214 |
| | | | 725/47 |
| 2016/0179816 A1* | 6/2016 | Glover | G06F 16/24578 |
| | | | 707/767 |
| 2016/0371395 A1* | 12/2016 | Dumant | G06F 16/90324 |
| 2017/0085962 A1* | 3/2017 | Maughan | H04N 21/25883 |
| 2017/0091883 A1* | 3/2017 | Greystoke | G06Q 50/14 |
| 2017/0139926 A1* | 5/2017 | Baig | G06F 16/29 |
| 2017/0315707 A1* | 11/2017 | Jones | G06F 3/0484 |
| 2018/0130089 A1* | 5/2018 | Allouche | G06Q 30/0276 |
| 2018/0248886 A1* | 8/2018 | Hind | G06F 16/9538 |
| 2018/0367483 A1* | 12/2018 | Rodriguez | H04L 51/046 |
| 2018/0367484 A1* | 12/2018 | Rodriguez | H04L 51/10 |
| 2019/0102413 A1* | 4/2019 | Hsu | G06F 16/2237 |
| 2019/0251125 A1* | 8/2019 | Song | G06F 16/90324 |
| 2019/0334956 A1* | 10/2019 | Hodgins | H04L 65/403 |
| 2020/0068274 A1* | 2/2020 | Aher | G11B 27/034 |
| 2020/0097499 A1* | 3/2020 | Aher | G06F 16/90324 |
| 2020/0105274 A1* | 4/2020 | Joller | G06F 16/638 |
| 2020/0167384 A1* | 5/2020 | Aher | G06F 16/907 |
| 2021/0034987 A1* | 2/2021 | Filoti | G06N 5/02 |
| 2021/0073225 A1* | 3/2021 | Nelson | G06F 16/24537 |
| 2021/0294857 A1* | 9/2021 | Aher | G06F 40/247 |
| 2022/0107802 A1* | 4/2022 | Rao | G06F 16/907 |
| 2024/0061894 A1* | 2/2024 | Hong | G06F 40/242 |

* cited by examiner

SYSTEMS AND METHODS FOR GENERATING QUERY SUGGESTIONS

BACKGROUND

This disclosure is generally directed to generating suggestions. In particular, methods and systems are provided for creating suggested voice queries.

SUMMARY

Media systems commonly receive search inputs (e.g., voice inputs) from a user to search for media assets. Often, the users are not fully cognizant of the search capabilities of the media system and may utilize only a select few queries to search for media assets. For example, some users may only ever search for media assets by title when using voice commands. Consequently, such a user may be completely unable to search for a movie when she has forgotten the title of the movie, but knows other information (actor, release date) related to the movie, as the user is unaware of other metadata fields that may be used to search for a movie in the media system. Help provided by such systems is often static and commonly irrelevant to the specific search needs of a specific user.

Accordingly, to overcome such problems, the systems and methods disclosed herein automatedly generate and provide relevant query suggestions designed to encourage the user to utilize new search features. To that end, the media system uses a resolved search to suggest to the user how the user may have otherwise found the asset. In response to a user selecting a search result, the media system retrieves a plurality of metadata fields associated with the selected media asset and generates combinations of the metadata fields. The media system searches its database using the field values of each combination of metadata fields, and calculates a number of matching media assets resulting from each search. The media system selects the combination of metadata fields with the lowest associated calculated number, and uses it to generate a suggested query, that is presented to the user.

In some embodiments disclosed below, combinations of metadata fields are generated from least-used metadata fields. Because the suggested query is presented to the user in the form of a query and not simply combination of metadata fields, the media system uses a template query to generate the suggested query using the metadata fields. The template query includes placeholders for values of different metadata fields. The media system inserts the value of the relevant metadata field in the template query to generate the suggested query. For example, a template query that has metadata fields of "Release Date" and "Director" may be of the form "Show me a movie by <insert Director name> released in <insert Release Date>. A suggested query to access the media asset "The Dark Knight" in the media system using the determined combination of metadata fields "Release Date" and "Director", may be "Show me a movie by Christopher Nolan and released in 2008." In order to select the right template query to generate the suggested query, the media system searches the plurality of template queries for a query that includes each metadata field in the combination of metadata fields. In some embodiments disclosed below, queries from the plurality of template queries are selected based on the frequency of use.

After the suggested query is presented, the media system may receive another input. This input may be same as the suggested query, to test the suggested query, or may be unrelated. To differentiate inputs testing the suggest query from inputs unrelated to the suggested query, the media system determines how much time has passed between the first input and the second input. In cases where the second input is received within a threshold time of the first input, the media system determines that the second input is testing the suggested query. In response to the second input, the media system provides the user with a media asset listing corresponding to the media asset. The threshold may be specified by a user through a user interface presented by the media system.

In cases where the second input is not received within the a threshold time after the first input, the media system determines that the second input is not related to the first input and generates all the possible media assets that contain metadata fields that match the combination of metadata fields that are being tested by the media system.

Because the media system is trying to educate the user about the different search capabilities of the media system, the process of generating suggested queries may include removing metadata fields that have just been used in the media asset search. In some embodiments, the media system determines metadata fields that are part of the received user input. For example, if the initial query includes the "Title" field is not part of the metadata fields that are used to make the plurality of metadata combinations.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are disclosed herein for generating queries to encourage the user to utilize new search features of a media system. To that end, the media system retrieves a set of metadata fields that are historically least used in search queries inputted by the user. These metadata fields are used to suggest queries to the user so as to inform the user of the features of the media system that the user was not previously utilizing. In such an implementation, it is useful to generate suggested queries that yields only a single result, i.e., the media asset that the user is intending to search for using the initial user input. Providing such suggested queries informs the user of other queries, that include metadata fields that are not frequently used by the user, to search for media assets on the media system.

Figure 1:
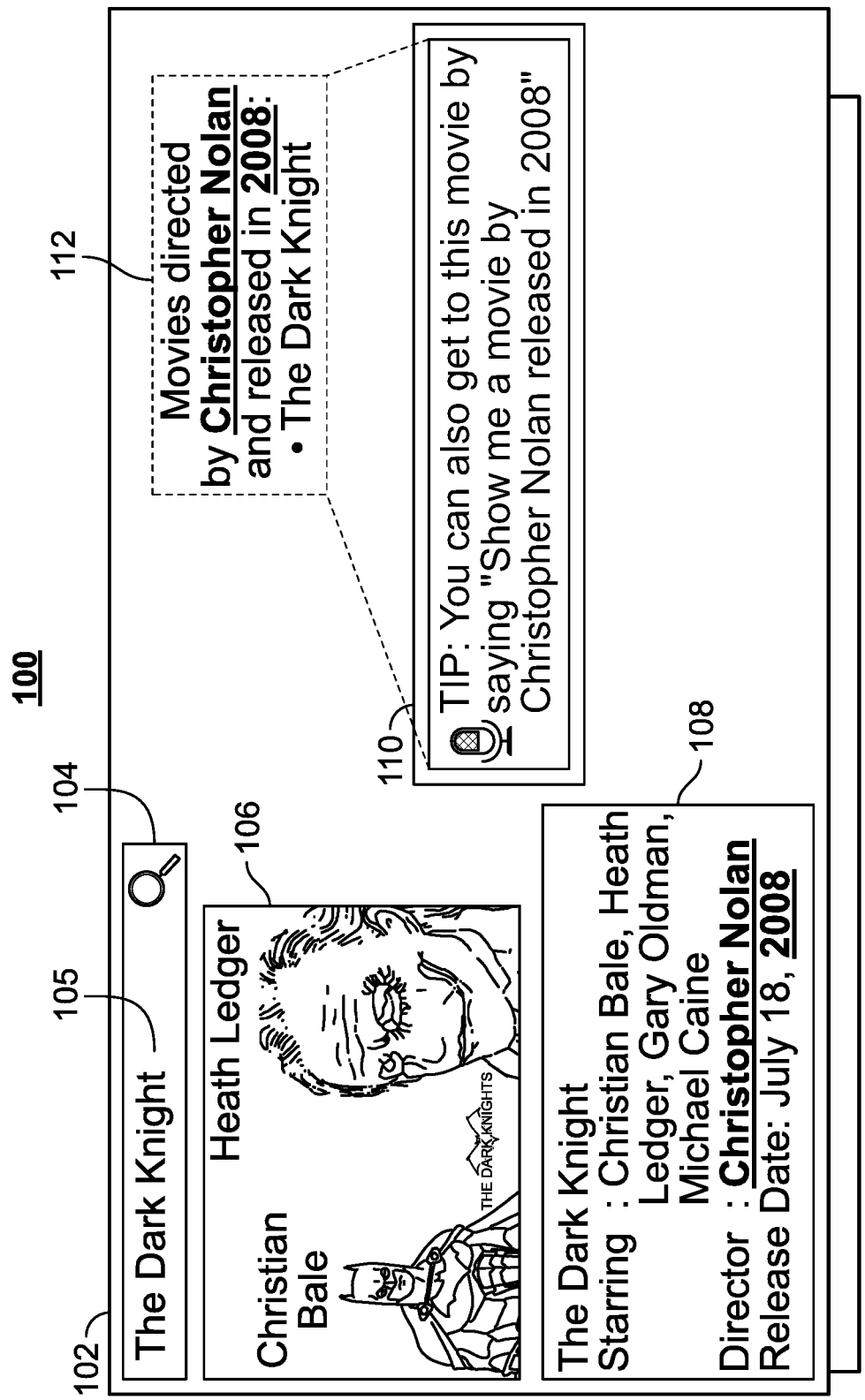
FIG. 1 shows an illustrative example of generating query suggestions, in accordance with an illustrative embodiment.

FIG. 1 shows an illustrative example of generating query suggestions, in accordance with an illustrative embodiment. FIG. 1 shows a display of 102 of a user equipment device that is displaying a media system interface used to search for media stored on the media system. Media system interface includes a search bar 104 that is used to receive text user input 105. The media system may also receive user input via an audio signal received via an audio input, for example by using a personal assistant device 224 (described in more detail in FIG. 2). As depicted in FIG. 1, user may search for a movie, by entering "The Dark Knight" as text user input 104 in search bar 104 of the media system interface. In response to receiving text user input 105, the media system presents a listing of the movie "The Dark Knight" in the media system interface. The listing includes an image 106 and metadata information 108 related to the media asset. The image 106 may be a poster of the media asset "The Dark Knight" retrieved from the media system. The media system also presents metadata 108 associated with the media asset to accompany to the image 106 of the listing of the media asset.

The metadata 108 may include a plurality of metadata fields including actors, director, release date, title, any other metadata filed or any combination thereof. The metadata items depicted in the interface in FIG. 1 are exemplary. Metadata 108 may include more or fewer metadata fields than shown. In FIG. 1, the title of the media asset is "The Dark Knight", the actors are listed as "Christian Bale, Heath Ledger, Gary Oldman, Michael Caine", the director is listed as "Christopher Nolan" and the release date is listed as "Jul. 18, 2008". In some embodiments, the metadata fields may be input in the media system when the media asset is imported in the media system from a remote database. In some other embodiments, the metadata fields may be received manually from a user that saves the media asset in the media system. The display of the interface of the media system in FIG. 1 is exemplary.

Figure 9:
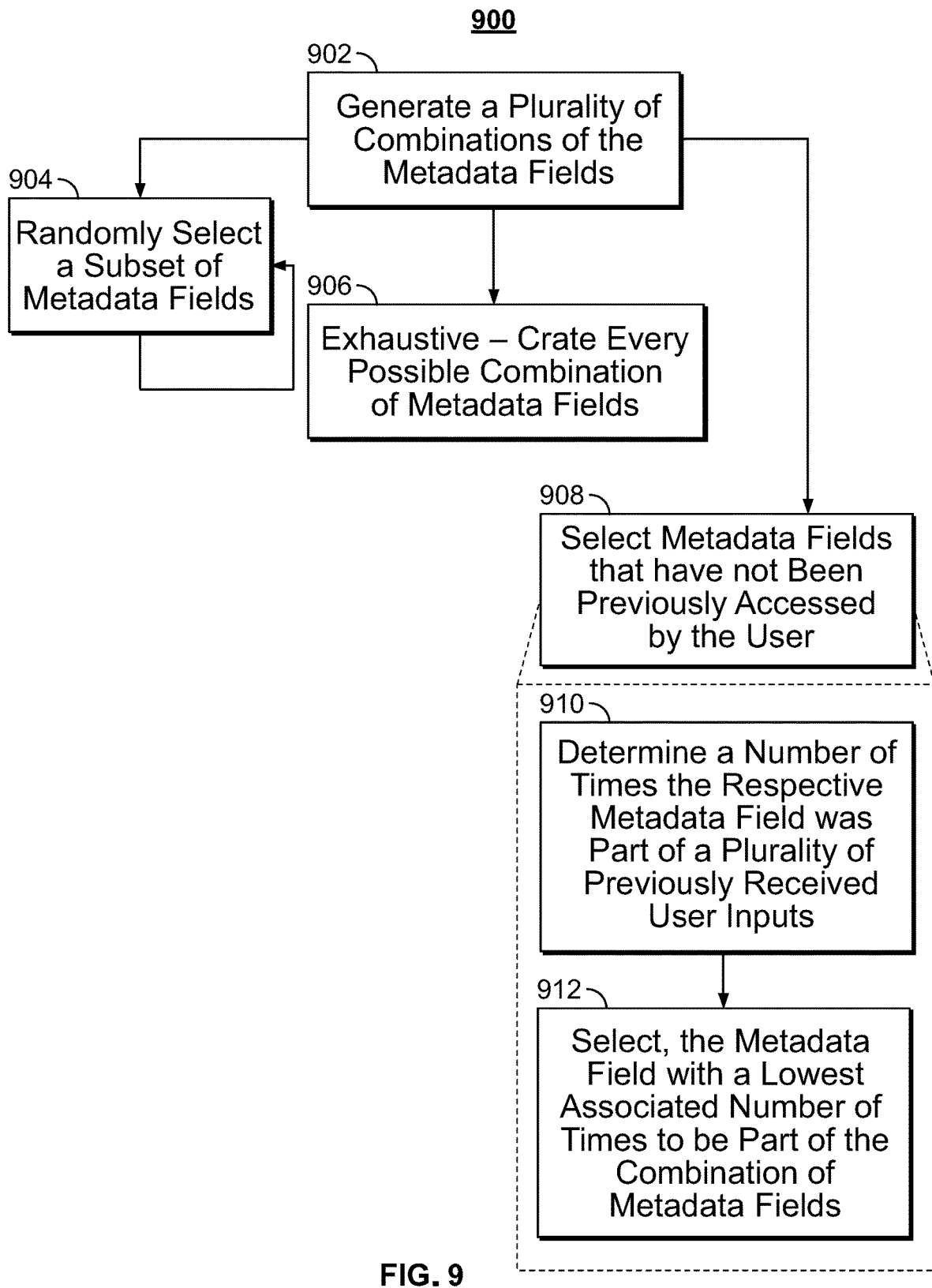
FIG. 9 is a flowchart of a detailed illustrative process for generating a plurality of combination of metadata fields, in accordance with some embodiments of the disclosure.

Using the metadata fields of the media asset, the media system generates a plurality of combinations of metadata fields (described in more detail in FIG. 9). For example, a first combination of metadata fields related to "The Dark Knight" may be "Actors" (Christian Bale, Heath Ledger, Michael Caine, Morgan Freeman) and "Running Time" (2 hours and 37 minutes). A second combination of metadata fields may be "Director" (Christopher Nolan) and "Release date" (Jul. 18, 2008).

The media system keeps track of each query. The metadata fields used by the various queries are tabulated. The media system is able to keep a count of how many times a metadata field, for example, "Title" and "Actor" have been used for searching media assets. From the tally, the media system is able to determine which are most frequently used and the least frequently used metadata fields for searching the media system. For example, every time a user searches for content by title of a movie (e.g., "The Dark Knight") the media system increments that type of search for "Title" by 1. Based on the running tally, the media system may exclude some of the most frequently used metadata fields from the plurality of combination of metadata fields. For example, the media system may exclude the "Title" field from the plurality of metadata fields that are used to generate the combinations of metadata fields because of the frequent use of the "Title" field by the user. In some embodiments, the media system always excludes from the combination of metadata fields, metadata fields that are part of the user input. In this example, based on the text user input 104 received in search bar 105, the media system will not include the "Title" field in any of the combination of metadata fields.

To generate combinations of metadata fields, the media system determines the least number of metadata fields that uniquely identify the media asset. In this example, the media system selects a first metadata field and determines whether that field is able to uniquely identify the media asset. The media system may select the metadata field "release date". In some embodiments, the media system may not use the whole release date (e.g., Jul. 18, 2008) but only a portion of the release date (year "2008") to broaden the search query. The media system may run a search with only the release date "2008" and determine that there are multiple media assets that match the release date of "2008." Some other movies released in 2008 include "Iron Man", "Mamma Mia", "Hancock", and "Kung Fu Panda". As the metadata field of release date does not uniquely identify the media asset "The Dark Knight", the media system may select a second metadata field to combine with the first metadata field. From the metadata 108 associated with the media asset, the media system may select a second metadata field of "Director". In this example, the media system may combine the metadata field "Release Date" with the metadata field "Director" to determine the number of media assets that satisfy the criteria presented by the two metadata fields. In case the combination of metadata fields yields more than one media asset, the media system may add a third metadata field to the combination (e.g., actor Heath Ledger"). An exemplary process of selecting metadata fields to generate combinations of metadata fields is described in more detail in FIGS. 9 and 13. In some embodiments, the selection of the metadata fields may be based on frequency of use. For example, the media system may select the least recently used metadata field as the first metadata field ("Release Date"), and so on.

The media system selects a template query based on the combination of metadata fields that are determined to uniquely identify the media asset. In this example, the metadata fields are "Release Date" and "Director". For example, a template query that includes the metadata fields of "Director" and "Release Date" is formed as "Show me a movie by <director_name> and released in <movie_relase-_date>." In order to form a query based on the sample template query, the media system inserts the relevant director's name in place of <director_name> tag and inserts the relevant release of date in place of <movie_release_date>. In one implementation, the media system may use media asset queries entered by the user previously to generate template queries. An exemplary process of generating template queries is further described in greater detail in FIGS. 10 and 11.

In some embodiments, the metadata fields are selected based on efficiency of the query that will be formed using the selected metadata fields. The efficiency of the query may be measured based on at least one of: (i) number of metadata fields used in the query and, (ii) the time taken by the media system to return search results of the query. In some embodiments, the efficiency of the query is measured using a combination of the two parameters.

For example, metadata fields that uniquely identify the movie "The Dark Knight" are "Release Date", "Genre", and "Actor". In this example, a query containing these fields may has the form "Show me a <genre> movie released in <movie_relase_date> starring <actor_name>." Additionally, the metadata fields "Release Date" and "Director" are also able to uniquely identify the movie "The Dark Knight." As described above, a query that uniquely identifies the movie "The Dark Knight" using "Release Date" and "Director" may be of the form "Show me a movie by <director_name> and released in <movie_relase_date>." In this example, the query using two metadata fields is considered more efficient than the query containing three metadata fields, as the media system only needs to search data related to two metadata fields instead of three metadata fields. Thus, the media system may select the query with the fewer metadata fields that uniquely identifies the movie "The Dark Knight."

In another example, the media system determines an efficiency of the query based on an amount of time taken by the media system to retrieve search results based on the query using metadata fields that are part of the query. In this example, some metadata fields like "Running Time" may be hard to search, because there are many movies with very similar running times. Most movies today are about 2 hours long. Therefore, when searching for a movie "The Dark Knight", the media system may have to search the running time of each movie in the database. On the other hand, a metadata field like "Director" may be easier to search as the number of movies associated with a director are much fewer. Thus, the media system consumes less time in searching through the metadata field "Director" than in searching through the metadata field "Running Time". In such examples, the media system avoids using queries that contain the "Running Time" metadata field.

In the above example, metadata fields that uniquely identify the movie "The Dark Knight" are "Running Time" and "Genre". In this example, a query containing these fields may have the form "Show me a <genre> movie that is <running_time> hours long." Additionally, as described above, the metadata fields "Genre" and "Director" are also able to uniquely identify the movie "The Dark Knight." A query that uniquely identifies the movie "The Dark Knight" using "Genre" and "Director" may be of the form "Show me<genre> a movie by <director_name>." In this example, the query using "Running Time" metadata fields is considered less efficient than the query containing "Director" and "Genre" metadata fields because searches based on the "Running Time" metadata are known to take a long time to perform. Thus, the media system may select the query without the "Running Time" metadata field.

Figure 7:
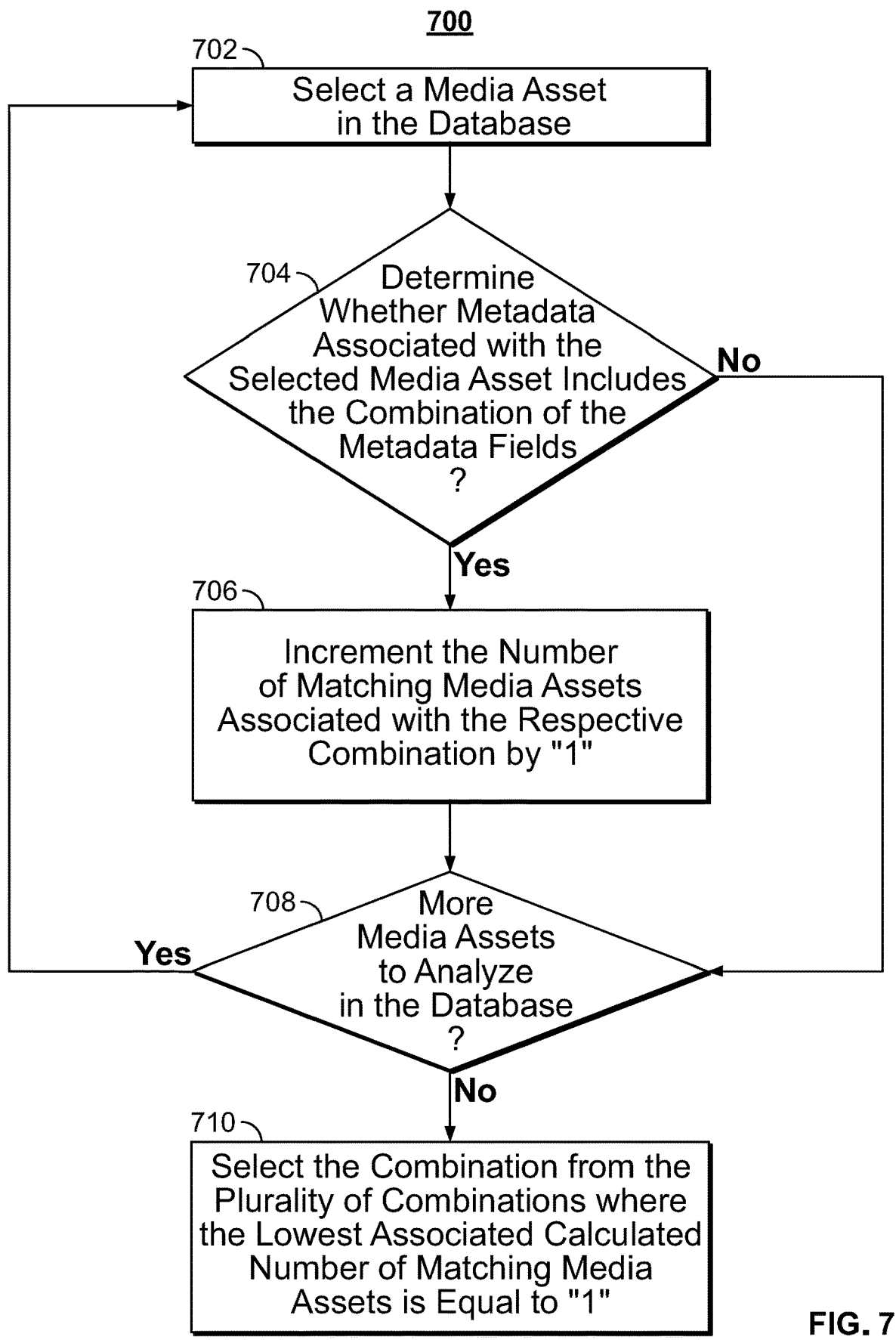
FIG. 7 is a flowchart of a detailed illustrative process for selecting a combination of metadata fields from the plurality of combinations of metadata fields in accordance with some embodiments of the disclosure.

The media system presents generated the query to the user in a popup 110 of the user interface of the media system based on metadata fields (described in greater detail in FIG. 7). In some embodiments, the generated system query is presented audibly using personal assistant device 224 of FIG. 2.

Figure 2:
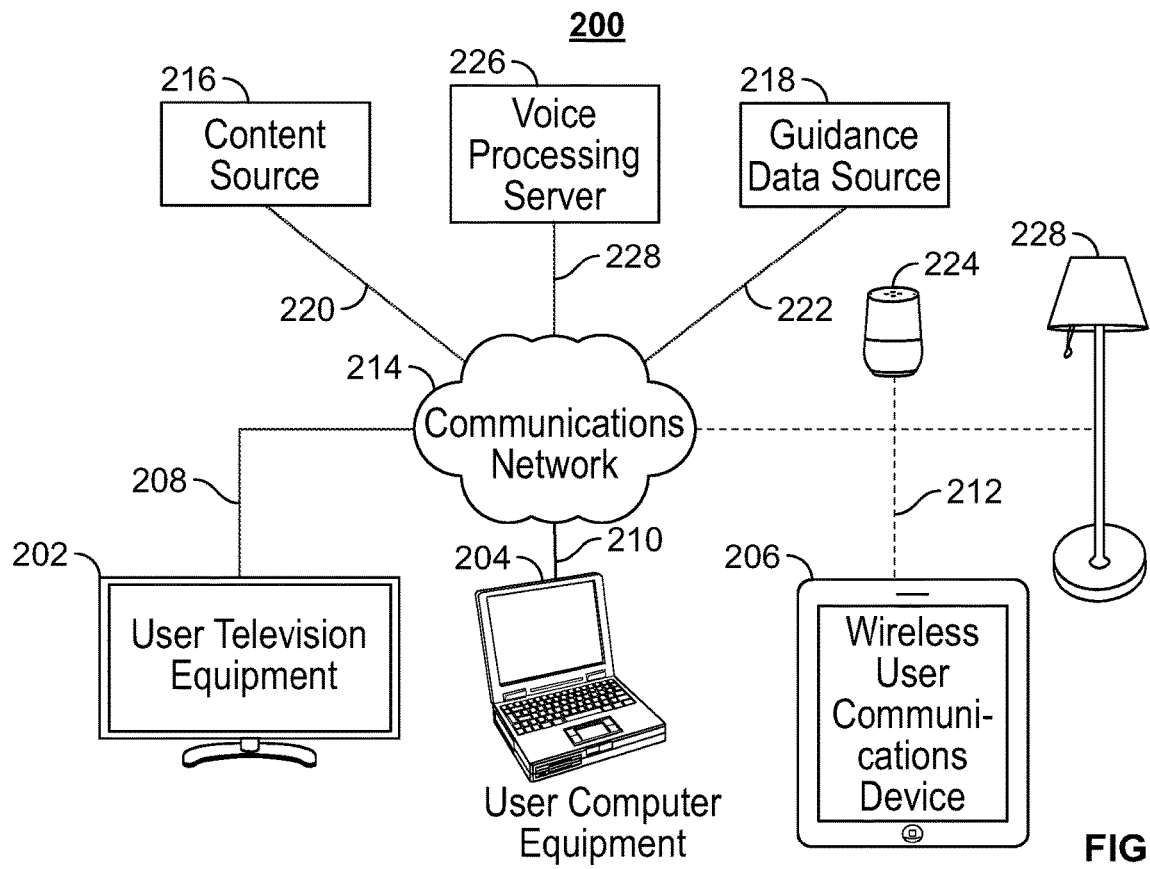
FIG. 2 is a block diagram of an illustrative media system in accordance with some embodiments of the disclosure.

User equipment device of FIG. 1 can be implemented in system 200 of FIG. 2 as user television equipment 202, user computer equipment 204, wireless user communications device 206, voice control device 224, or any other type of user equipment suitable for accessing media. For simplicity, these devices may be referred to herein collectively as user equipment or user equipment devices. User equipment devices, on which an application is implemented, may function as a standalone device or may be part of a network of devices. Various network configurations of devices may be implemented and are discussed in more detail below.

User television equipment 202 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 204 may include a PC, a laptop, a tablet, a WebTV box, a personal computer television (PC/TV), a PC media server, a PC media center, or other user computer equipment. WEBTV is a trademark owned by Microsoft Corp. Wireless user communications device 206 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 202, user computer equipment 204, and wireless user communications device 206 and voice control device 224 may utilize at least some of the system features described above in connection with FIG. 2 and, as a result, include flexibility with respect to the type of media content available on the device. For example, user television equipment 202 may be Internet-enabled allowing for access to Internet content, while user computer equipment 204 may include a tuner allowing for access to television programming. The voice control application (e.g., a voice control application associated with a media guidance application) may also have the same layout on the various different types of user equipment or may be tailored to the display capabilities of the user equipment. For example, on user computer equipment, the application may be provided as a web site accessed by a web browser. In another example, the application may be scaled down for wireless user communications devices.

In system 200, there is typically more than one of each type of user equipment device but only one of each is shown in FIG. 2 to avoid overcomplicating the drawing. In addition, each user may utilize more than one type of user equipment device (e.g., a user may have a television set and a computer) and also more than one of each type of user equipment device (e.g., a user may have a voice control device and a mobile telephone and/or multiple television sets).

The user equipment devices may be coupled to communications network 214. Namely, user television equipment 202, user computer equipment 204, and wireless user communications device 206 are coupled to communications network 214 via communications paths 208, 210, and 212, respectively. Communications network 214 may be one or more networks including the Internet, a mobile phone network, mobile device (e.g., iPhone) network, cable network, public switched telephone network, or other types of communications network or combinations of communications networks. Paths 208, 210, and 212 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 212 is drawn with dotted lines to indicate that in the exemplary embodiment shown in FIG. 2 it is a wireless path and paths 208 and 210 are drawn as solid lines to indicate they are wired paths (although these paths may be wireless paths, if desired). Communications with the user equipment devices may be provided by one or more of these communications paths but are shown as a single path in FIG. 2 to avoid overcomplicating the drawing.

Although communications paths are not drawn between user equipment devices, these devices may communicate directly with each other via communication paths, such as those described above in connection with paths 208, 210, and 212, as well other short-range point-to-point communication paths, such as USB cables, IEEE 1394 cables, wireless paths (e.g., Bluetooth, infrared, IEEE 902-11x, etc.), or other short-range communication via wired or wireless paths. BLUETOOTH is a certification mark owned by Bluetooth SIG, INC. The user equipment devices may also communicate with each other directly through an indirect path via communications network 214.

System 200 includes content source 216 and media guidance data source 218 coupled to communications network 214 via communication paths 220 and 222, respectively. Paths 220 and 222 may include any of the communication paths described above in connection with paths 208, 210, and 212. Communications with the content source 216 and media guidance data source 218 may be exchanged over one or more communications paths but are shown as a single path in FIG. 2 to avoid overcomplicating the drawing. In addition, there may be more than one of each of content source 216 and media guidance data source 218, but only one of each is shown in FIG. 2 to avoid overcomplicating the drawing. (The different types of each of these sources are discussed below.) If desired, content source 216 and media guidance data source 218 may be integrated as one source device. Although communications between sources 216 and 218 with user equipment devices 202, 204, 206, and 224 are shown as through communications network 214, in some embodiments, sources 216 and 218 may communicate directly with user equipment devices 202, 204, 206, and 224 via communication paths (not shown) such as those described above in connection with paths 208, 210, and 212.

Content source 216 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Content source 216 may be the originator of media content (e.g., a television broadcaster, a Webcast provider, etc.) or may not be the originator of media content (e.g., an on-demand media content provider, an Internet provider of video content of broadcast programs for downloading, etc.). Content source 216 may include cable sources, satellite providers, on-demand providers, Internet providers, or other providers of media content. Content source 216 may also include a remote media server used to store different types of media content (including video content selected by a user), in a location remote from any of the user equipment devices. Systems and methods for remote storage of media content and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 218 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel).

Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 218 may be provided to users' equipment using a client-server approach. For example, an application client residing on the user's equipment may initiate sessions with source 218 to obtain guidance data when needed. Media guidance data source 218 may provide user equipment devices 202, 204, 206, and 224 the voice control application and/or media guidance application itself or software updates for the media guidance application and/or voice control application.

The voice control application may be, for example, a stand-alone application implemented on user equipment devices. In other embodiments, voice control application may be a client-server application where only the client resides on the user equipment device. For example, the voice control application may be implemented partially as a client application on control circuitry 204 of user equipment device 202 and partially on a remote server as a server application (e.g., media guidance data source 218 or content source 216). The guidance application displays and/or voice control application displays may be generated by the media guidance data source 218 or content source 216 and transmitted to the user equipment devices. The media guidance data source 218 and content source 216 may also transmit data for storage on the user equipment, which then generates the guidance application displays based on instructions processed by control circuitry.

System 200 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 2.

In one approach, user equipment devices may communicate with each other within a home network. User equipment devices can communicate with each other directly via short-range point-to-point communication schemes describe above, via indirect paths through a hub or other similar device provided on a home network, or via communications network 214. Each of the multiple individuals in a single home may operate different user equipment devices on the home network. As a result, it may be desirable for various media guidance information or settings to be communicated between the different user equipment devices. For example, it may be desirable for users to maintain consistent settings on different user equipment devices within a home network, as described in greater detail in Ellis et al., U.S. patent application Ser. No. 11/179,410, filed Jul. 11, 3005. Different types of user equipment devices in a home network may also communicate with each other and/or transmit media content. For example, a user may transmit media content from user computer equipment to a portable video player or portable music player.

In a second approach, users may have multiple types of user equipment by which they access content, information and/or control a device. For example, some users may have home networks that are accessed by in-home and mobile devices. Users may control in-home devices via a voice control application implemented on a remote device. For example, users may access an online voice control application on a website via a personal computer at their office, or a mobile device such as a PDA or web-enabled mobile telephone. The user may set various settings (e.g., recordings, reminders, or other settings) on the voice control application to control the user's in-home equipment. The online guide may control the user's equipment directly, or by communicating with a voice control application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 3004, which is hereby incorporated by reference herein in its entirety.

In a third approach, users of user equipment devices inside and outside a home can use their voice control application to communicate directly with content source 216 to content and information. Specifically, users of user television equipment 204 and user computer equipment 206 may access, via the voice control application, a media guidance application to navigate among and locate desirable media content. Users may also access the media guidance application outside of the home using wireless user communications devices 206 to navigate among and locate desirable media content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 214. These cloud resources may include one or more content sources 216 and one or more media guidance data sources 218. In addition or in the alternative, the remote computing sites may include other user equipment devices, such as user television equipment 202, user computer equipment 204, and wireless user communications device 206. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 204 or wireless user communications device 206 having content capture feature. Alternatively, the user can first transfer the content to a user equipment device, such as user computer equipment 204. The user equipment device storing the content uploads the content to the cloud using a data transmission service on communications network 214. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a voice control application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 2.

Figure 3:
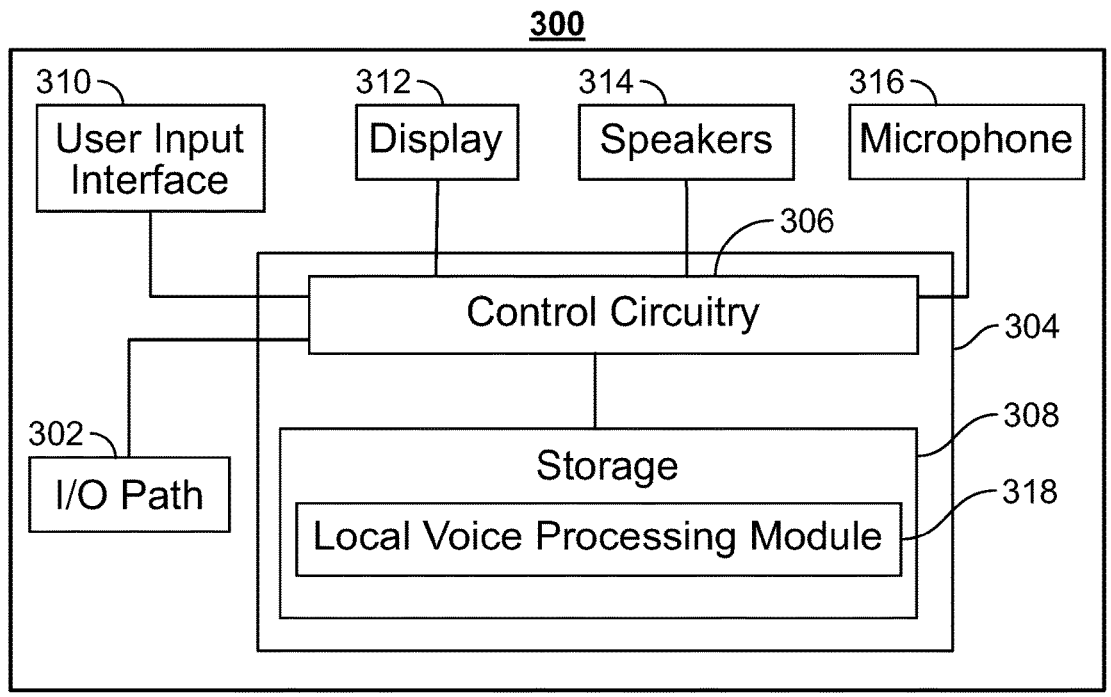
FIG. 3 is a block diagram of an illustrative user equipment device in accordance with some embodiments of the disclosure.

Users may access content, information, the voice control application and the media guidance application (and its display screens described above and below) from one or more of their user equipment devices. FIG. 3 shows a generalized embodiment of illustrative user equipment device 102. More specific implementations of user equipment devices are discussed below in connection with FIG. 3. User equipment device 300 may receive content and data via input/output (hereinafter "I/O") path 302. I/O path 302 may provide content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 2 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a voice control application stored in memory (i.e., storage 308). In client-server-based embodiments, control circuitry 304 may include communications circuitry suitable for communicating with a voice application and/or guidance application server or other networks or servers. Communications circuitry may include a cable modem, an integrated service digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 2). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of content described herein and guidance application and/or voice control application data, including program information, guidance application and/or voice control application settings, user preferences or profile information, or other data used in operating the guidance application and/or voice control application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 410. User input interface 310 may be any suitable user interface, such as a remote control, mouse, trackball, keypad, keyboard, touch screen, touch pad, stylus input, joystick, voice recognition interface, or other user input interfaces. Display 312 may be provided as a standalone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

The voice control application and/or guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, a network connection, or using another suitable approach). In another embodiment, the application is a client-server-based application. Data for use by a thick or thin client implemented on user equipment device 300 is retrieved on-demand by issuing requests to a server remote to the user equipment device 300. In one example of a client-server-based application, control circuitry 304 runs a web browser that interprets web pages provided by a remote server.

In yet other embodiments, the application is downloaded and interpreted or otherwise run by an interpreter or virtual machine (run by control circuitry 304). In some embodiments, the application may be encoded in the ETV Binary Interchange Format (EBIF), received by control circuitry 304 as part of a suitable feed, and interpreted by a user agent running on control circuitry 304. For example, the application may be a EBIF widget. In other embodiments, the application may be defined by a series of JAVA-based files that are received and run by a local virtual machine or other suitable middleware executed by control circuitry 404. In some of such embodiments (e.g., those employing MPEG-2 or other digital media encoding schemes), the application may be, for example, encoded and transmitted in an MPEG-2 object carousel with the MPEG audio and video packets of a program. In some embodiments, the application may be generated by a remote server and transmitted to user equipment as a MPEG stream.

User equipment device 300 of FIG. 3 can be implemented in system 600 of FIG. 2 as user television equipment 202, user computer equipment 204, wireless user communications device 206, voice control device 224, or any other type of user equipment suitable for accessing media, such as a non-portable gaming machine. For simplicity, these devices may be referred to herein collectively as user equipment or user equipment devices. User equipment devices, on which an application is implemented, may function as a standalone device or may be part of a network of devices. Various network configurations of devices may be implemented and are discussed in more detail below.

It should be noted that with the advent of television tuner cards for PC's, WebTV, and the integration of video into other user equipment devices, the lines have become blurred when trying to classify a device as one of the above devices. In fact, each of user television equipment 202, user computer equipment 204, and wireless user communications device 206 and voice control device 224 may utilize at least some of the system features described above in connection with FIG. 2 and, as a result, include flexibility with respect to the type of media content available on the device. For example, user television equipment 202 may be Internet-enabled allowing for access to Internet content, while user computer equipment 204 may include a tuner allowing for access to television programming. Thea voice control application (e.g., a voice control application associated with a media guidance application) may also have the same layout on the various different types of user equipment or may be tailored to the display capabilities of the user equipment. For example, on user computer equipment, the application may be provided as a web site accessed by a web browser. In another example, the application may be scaled down for wireless user communications devices.

Figure 4:
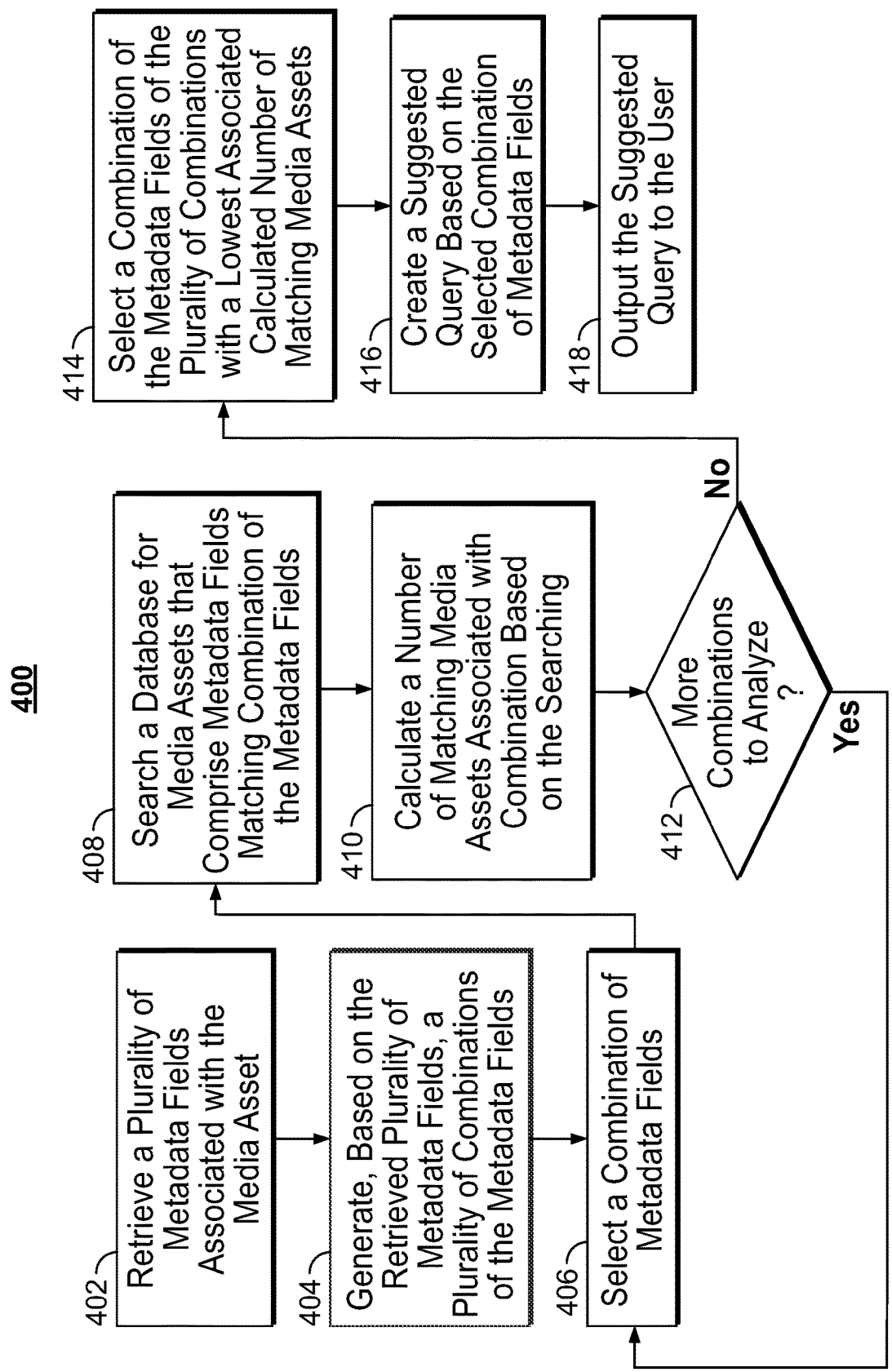
FIG. 4 is a flowchart of a detailed illustrative process for generating query suggestions, in accordance with an illustrative embodiment.

FIG. 4 is a flowchart of a detailed illustrative process for generating query suggestions, in accordance with some embodiments of the disclosure. It should be noted that process 400 or any step thereof could be performed on, or provided by, any of the devices shown in FIGS. 2-3. For example, process 400 may be executed by control circuitry 304 (FIG. 3) as instructed by a media system implemented on display 102 of a user equipment device (which may have the functionality of any or all of user equipment 202, 204, and/or 206 (FIG. 2)). In addition, one or more steps of process 400 may be incorporated into or combined with one or more steps of any other process or embodiment (e.g., as described in relation to FIGS. 5-13).

Process 400 begins at 402, where control circuitry (e.g., control circuitry 304) retrieves a plurality of metadata fields stored at storage (e.g., at storage 308) associated with a media asset. Metadata fields may include, for example, "Title" of the movie (The Dark Knight), "Actors" (Christian Bale, Heath Ledger, Michael Caine, Morgan Freeman), "Running Time" (2 hours 37 minutes), "Release Date" (Jul. 18, 2008), "Director" (Christopher Nolan) and other information related to the media asset that the user was searching for.

At 404, control circuitry generates, based on the retrieved plurality of metadata fields, a plurality of combinations of the metadata fields. For example, a first combination of metadata fields related to "The Dark Knight" may be "Actors" (Christian Bale, Heath Ledger, Michael Caine, Morgan Freeman) and "Running Time" (2 hours and 37 minutes). A second combination of metadata fields may be "Director" (Christopher Nolan) and "Release date" (Jul. 18, 2008).

At 406, control circuitry selects a combination of metadata fields. At 408, control circuitry searches a database at storage (e.g. storage 308) for media assets that comprise metadata fields matching the respective combination of the metadata fields. The plurality of combinations is generated at 404. At 410, control circuitry calculates a number of media assets that match the respective combination based on the searching. At decision block 412, control circuitry determines whether there are more combinations of metadata fields generated at 404 to analyze. In response to determining that there are more combinations to analyze, control circuitry moves process 400 to 406 to select another combination of metadata fields. In response to determining that there are no more combinations to analyze, control circuitry moves process 400 to 414 selects a combination of the metadata fields of the plurality of combinations with a lowest associated calculated number of matching media assets.

For example, the control circuitry may select a first combination of metadata fields that include "Actors" (Christian Bale, Heath Ledger, Michael Caine, Morgan Freeman) and "Running Time" (2 hours and 37 minutes) and calculate a number of media assets associated with the combination of metadata assets. In this example, there might be two movies featuring Michael Caine that run for over 2 hours ("The Dark Knight"and" The Prestige"). The control circuitry may select a second combination of metadata fields that include "Director" (Christopher Nolan) and "Release Date" (Jul. 18, 2008) and calculate that only one movie directed by Christopher Nolan was released on Jul. 18, 2008 (The Dark Knight).

In this example, the control circuitry selects the combination of director and release date as there is only one media asset (The Dark Knight) associated with that combination.

At 416, control circuitry creates a suggested query based on the selected combination of metadata fields. At 418, control circuitry 418 outputs the suggested query to user equipment device 102.

For example, the control circuitry determines a template query, from a plurality of template queries that may be phrased using the two metadata fields of "Director" and "Release Date", and forms a query using the template query and the two metadata fields. For example, a template query that includes the metadata fields of "Director" and "Release Date" is formed as "Show me a movie by <director_name> and released in <movie_relase_date>."

Figure 5:
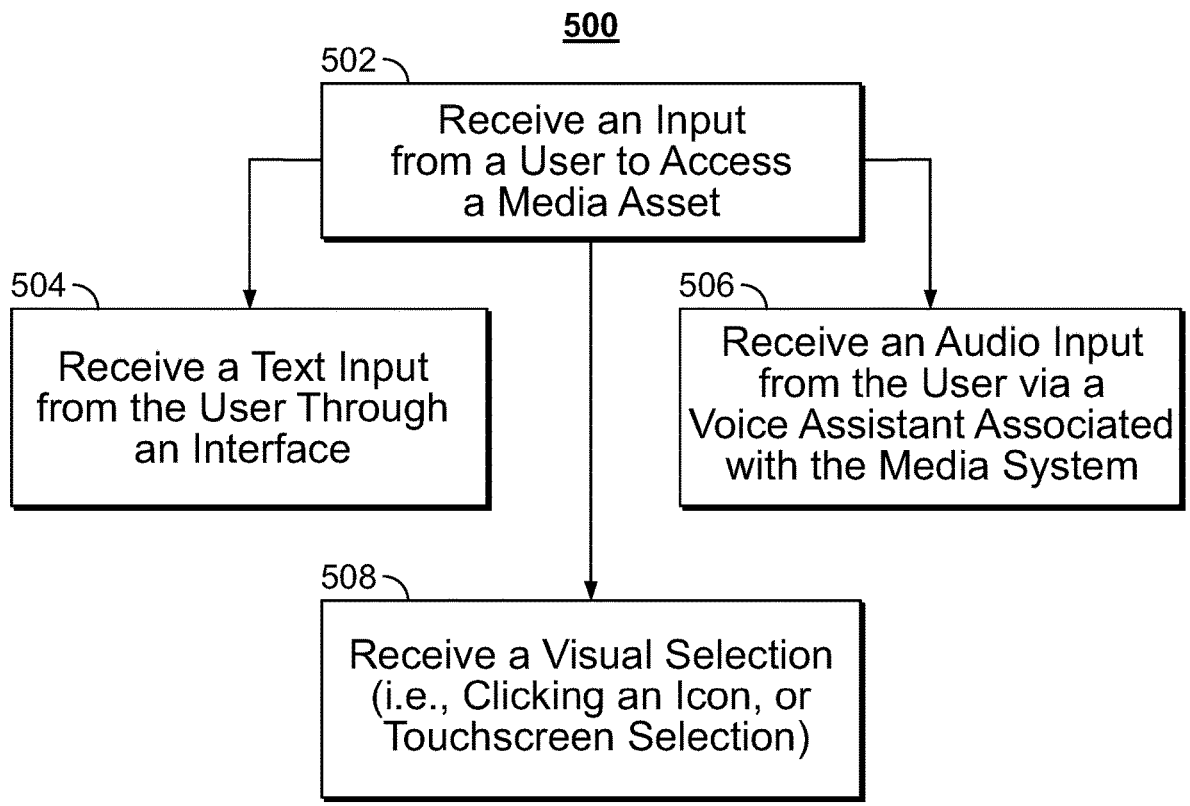
FIG. 5 is a flowchart of a detailed illustrative process for receiving a user input from a user to access a media asset, in accordance with some embodiments of the disclosure.

FIG. 5 is a flowchart of a detailed illustrative process for receiving a user input from a user to access a media asset, in accordance with some embodiments of the disclosure. It should be noted that process 500 or any step thereof could be performed on, or provided by, any of the devices shown in FIGS. 2-3. For example, process 500 may be executed by control circuitry 304 (FIG. 3) as instructed by a media system implemented on display 102 of user equipment device (which may have the functionality of any or all of user equipment 202, 204, and/or 206 (FIG. 2)). In addition, one or more steps of process 500 may be incorporated into or combined with one or more steps of any other process or embodiment (e.g., as described in relation to FIGS. 4 and 6-13).

At 502, control circuitry (e.g., control circuitry 304) receives an input from a user to access a media asset. In some embodiments, at 504, the input is received when a user enters text in a search bar (e.g. in search bar 104) through an interface (e.g., user input interface 310). In some embodiments, at 506, the input is received via a user selection (e.g., clicking, touching) of a media asset in the interface. In some embodiments, the input is an audio input received via a microphone (e.g., microphone 316) of a voice assistant (e.g., voice assistance 224).

Figure 6:
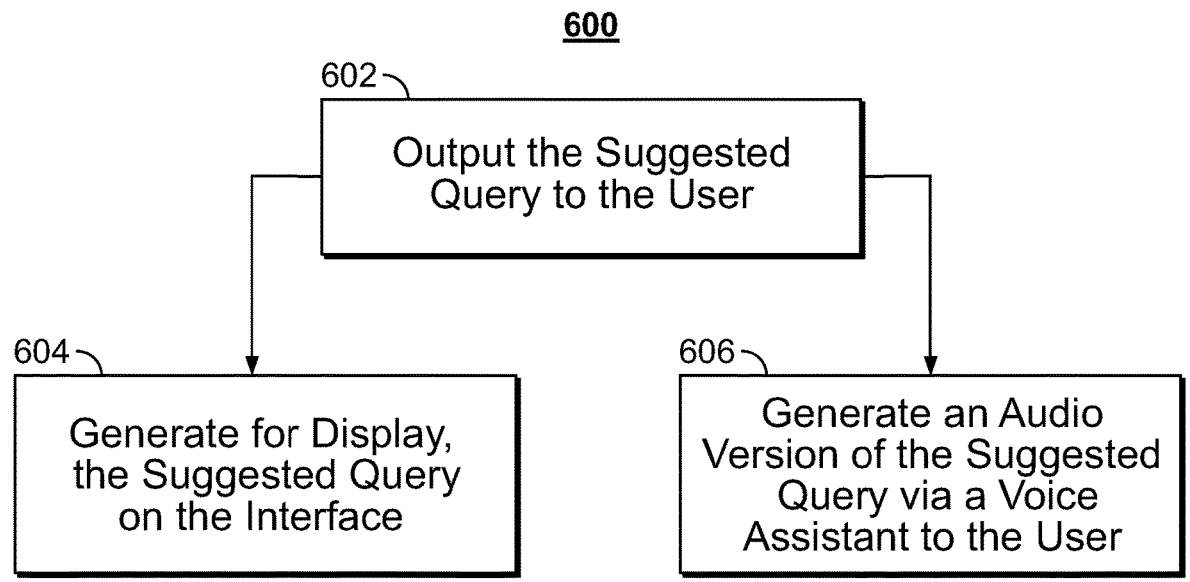
FIG. 6 is a flowchart of a detailed illustrative process for outputting the suggested query to the user, in accordance with some embodiments of the disclosure.

FIG. 6 is a flowchart of a detailed illustrative process for outputting the suggested query to the user, in accordance with some embodiments of the disclosure. It should be noted that process 600 or any step thereof could be performed on, or provided by, any of the devices shown in FIGS. 2-3. For example, process 600 may be executed by control circuitry 304 (FIG. 3) as instructed by a media system implemented on display 102 of user equipment device (which may have the functionality of any or all of user equipment 202, 204, and/or 206 (FIG. 2)). In addition, one or more steps of process 600 may be incorporated into or combined with one or more steps of any other process or embodiment (e.g., as described in relation to FIGS. 4-5 and 7-13).

At 602, control circuitry (e.g. control circuitry 304) outputs the suggested query to the user. In some embodiments, at 604, the control circuitry outputs for display, the suggested query on display 102 of user equipment device. In some embodiments, at 606, the suggested query is output is received via speakers (e.g., speakers 314) of a voice assistant (e.g., voice assistance 224).

FIG. 7 is a flowchart of a detailed illustrative process for selecting a combination of metadata fields from the plurality of combinations of metadata fields in accordance with some embodiments of the disclosure. It should be noted that process 700 or any step thereof could be performed on, or provided by, any of the devices shown in FIGS. 2-3. For example, process 700 may be executed by control circuitry 304 (FIG. 3) as instructed by a media system implemented on display 102 of user equipment device (which may have the functionality of any or all of user equipment 202, 204, and/or 206 (FIG. 2)). In addition, one or more steps of process 700 may be incorporated into or combined with one or more steps of any other process or embodiment (e.g., as described in relation to FIGS. 4-6 and 8-13).

Process 700 begins at 702 when control circuitry 304 selects a media asset in the database. For example, the store (e.g., storage 308) may include other movies in addition to "The Dark Knight". In such examples, different metadata fields may be associated with different media assets. For example, the storage may include "The Dark Knight", "The Prestige", "Titanic" and "Shutter Island".

At decision block 704, control circuitry 304 determines whether metadata associated with the selected media asset, stored at storage 308, includes the combination of the metadata fields. For example, in case of the combination of metadata fields generated from the metadata fields from "The Dark Knight", the control circuitry may search for the first combination of metadata fields ("Actors" and "Running Time") in metadata associated with other media assets stored in the control circuitry. While iterating through the movies stored, the control circuitry may determine that the movie "The Prestige" has actor "Michael Caine" and a "Running Time" of greater than 2 hours, just like "The Dark Knight". So, the number of media assets associated the first combination of metadata fields is 2. When the control circuitry searches using the second combination of metadata fields ("Release Date" and "Director"), "The Dark Knight" is the only search result as that is the only Christopher Nolan Movie released in 2008. While "The Prestige" is a Christopher Nolan movie, it was released in 2006. Therefore, the movie "The Prestige" does not include the second combination of metadata fields.

In response to determining that the metadata associated with the selected media asset includes the combination of the metadata fields, control circuitry proceeds process 700 to 706 to increment the number of matching media assets associated with the respective combination by one. In response to determining that the metadata associated with the selected media asset does not include the combination of the metadata fields, control circuitry proceeds process 700 to 708 to determine whether there are more media assets, left in database at storage 308, to analyze. In response to determining that there are more media assets to analyze, control circuitry proceeds process 700 to 702 to select another media asset in the database. In response to determining that there are more media assets to analyze, control circuitry proceeds process 700 to 710 to select the combination from the plurality of combinations where the lowest associated calculated number of matching media assets is equal to one.

As shown in the example above, the first combination of fields ("Actors" and "Running Time") have two results associated with it ("The Prestige" and "The Dark Knight"), but the second combination of metadata fields, has only one result associated with it ("The Dark Knight"). So, control circuitry selects the second combination of metadata fields to generate a suggested query.

Figure 8:
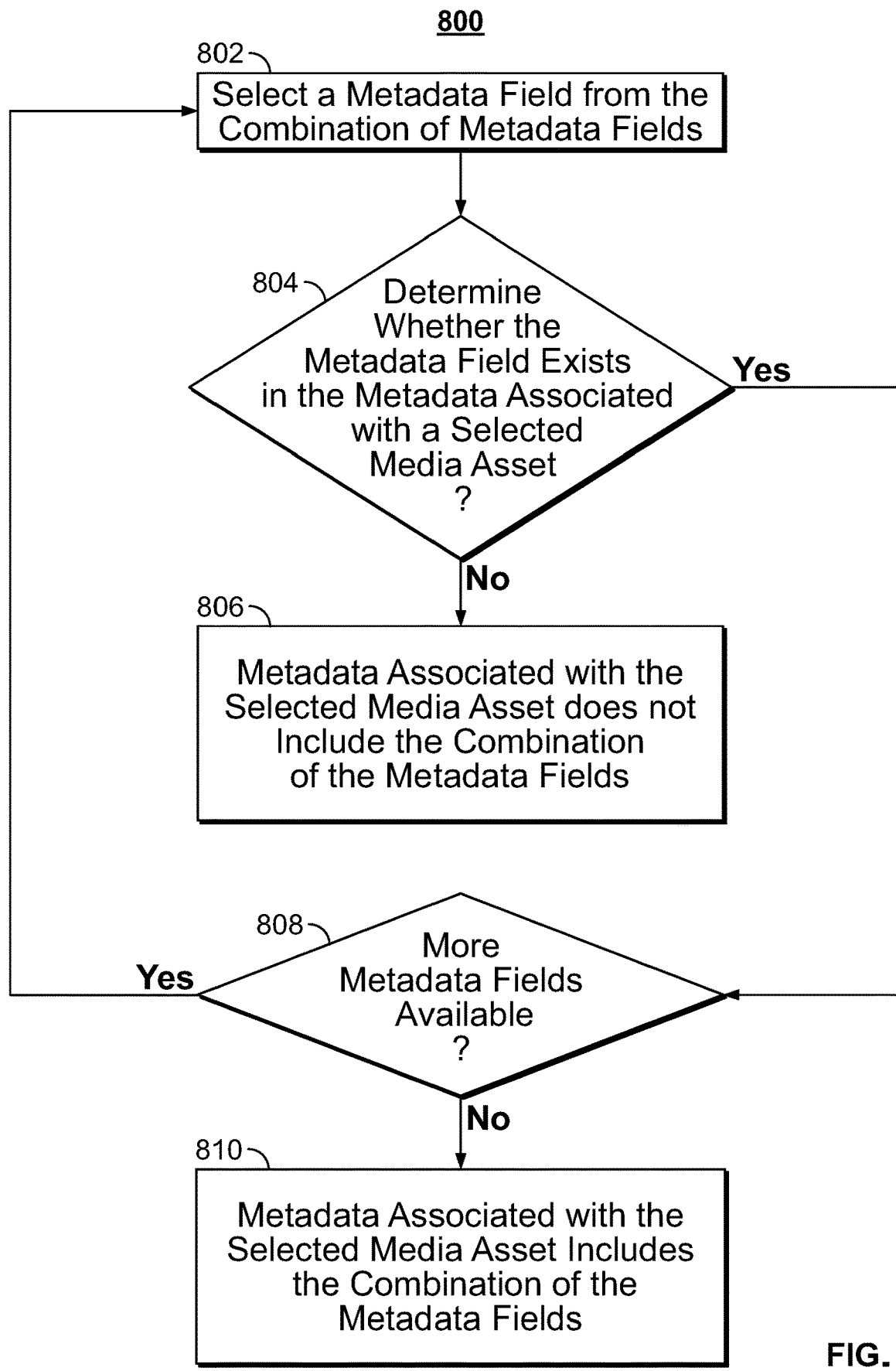
FIG. 8 is a flowchart of a detailed illustrative process for determining whether each field in the combination of metadata field is present in the metadata of a selected media asset, in accordance with some embodiments of the disclosure.

FIG. 8 is a flowchart of a detailed illustrative process for determining whether each field in the combination of metadata field is present in the metadata of a selected media asset, in accordance with some embodiments of the disclosure. It should be noted that process 800 or any step thereof could be performed on, or provided by, any of the devices shown in FIGS. 2-3. For example, process 800 may be executed by control circuitry 304 (FIG. 3) as instructed by a media system implemented on user equipment 102 (which may have the functionality of any or all of user equipment 202, 204, and/or 206 (FIG. 2)). In addition, one or more steps of process 800 may be incorporated into or combined with one or more steps of any other process or embodiment (e.g., as described in relation to FIGS. 4-7 and 9-13). Many elements of process 800 have been described above with respect to FIG. 1, and those descriptions have full force and effect with respect to the below description of process 800, and thus details on previously-described elements are omitted for the sake of brevity.

Process 800 begins at 802 where control circuitry 304 selects a metadata field from the combination of metadata field. At decision block 804, control circuitry 304 determines whether the metadata field exists in the metadata associated with a selected media asset. In response to determining that the metadata field does not exist in the metadata associated with the selected media asset, control circuitry 304 proceeds process 800 to 806 determine that the metadata associated with the selected media asset does not include the combination of metadata fields. In response to determining that the metadata field exists in the metadata associated with the selected media asset, control circuitry 304 proceeds process 800 to 808 to determine if there are more metadata fields of the combination of metadata field to analyze. In response to determining that there are more metadata fields in the combination of metadata fields left to analyze, control circuitry 304 proceeds process 800 to 802 to select a metadata field from a combination of metadata fields. In response to determining that there are no more metadata fields in the combination of metadata fields left to analyze, control circuitry 304 proceeds process 800 to 810 to conclude that metadata associated with the selected media asset includes the combination of metadata fields.

In some embodiments, to determine that the metadata associated with the media asset includes a combination of metadata fields, the media system determines that the media asset includes each metadata field in the combination of metadata fields and that the value of each metadata field of the media asset matches the value of the corresponding metadata field in the combination of metadata fields. For example, in case of the combination of metadata fields generated from the metadata fields from "The Dark Knight", the control circuitry may search for the first combination of metadata fields ("Actors" and "Running Time") or the second combination of metadata fields ("Director" and "Release Date") in metadata associated with other media assets stored in storage of the control circuitry. While iterating through the movies stored, the control circuitry may determine that the metadata associated with the movie "Titanic" ("Titanic") may not have a "Running Time" field. Similarly, the movie "Shutter Island" may not have the "Director" metadata field stored along with metadata of the movie. Therefore, the metadata associated with the movies "Shutter Island" and "Titanic" may not contain the same metadata fields as the first combination and the second combination of metadata fields respectively. Additionally, determining that the media asset contains the combination of metadata fields also includes determining whether the value of each metadata field of the media asset matches a corresponding value of the metadata field of the combination of metadata fields. For example, when using the second combination of metadata fields ("Release Date" and "Director"), the control circuitry determines that while "The Prestige" does contain the metadata field "Release Date", the release date of "The Prestige" is 2006, which is different from the release date of "The Dark Knight" (2008). Therefore, the metadata of the movie "The Prestige", does not contain the second combination of metadata fields.

FIG. 9 is a flowchart of a detailed illustrative process for generating a plurality of combination of metadata fields, in accordance with some embodiments of the disclosure. It should be noted that process 900 or any step thereof could be performed on, or provided by, any of the devices shown in FIGS. 2-3. For example, process 900 may be executed by control circuitry 304 (FIG. 3) as instructed by a media system implemented on display 102 of user equipment device (which may have the functionality of any or all of user equipment 202, 204, and/or 206 (FIG. 2)). In addition, one or more steps of process 900 may be incorporated into or combined with one or more steps of any other process or embodiment (e.g., as described in relation to FIGS. 4-8 and 10-13).

At 902, control circuitry (e.g., control circuitry 304) generates a plurality of combinations of metadata fields. In some embodiments, at 904, control circuitry randomly selects a subset of metadata fields. In some embodiments, at 906, control circuitry creates an exhaustive list of a plurality of combination of metadata fields using every possible metadata field available. At 908, control circuitry selects metadata fields that not been previously accessed by the user. At 910, control circuitry determines a number of times the respective metadata field was part of a plurality of previously received user inputs. At 912, control circuitry selects, the metadata field with a lowest associated number of times to be part of the combination of metadata fields. For example, the control circuitry maintains a running tally for each metadata field used in a search. Every time a user searches by name of a movie (e.g., "The Dark Knight") the media system increments the tally for the metadata field "Title" by 1. Based on the running tally, the media system may exclude some of the most frequently used metadata fields from the plurality of combination of metadata fields. For example, the media system may exclude the "Title" field from the plurality of metadata fields that are used to generate the combinations of metadata fields because of the frequent use of the "Title" field by the user. Based on the same running tally, the media system may determine that "Release Date" is never used by the user to perform a search, and so "Release Date" may be part of the set of metadata fields.

Figure 10:
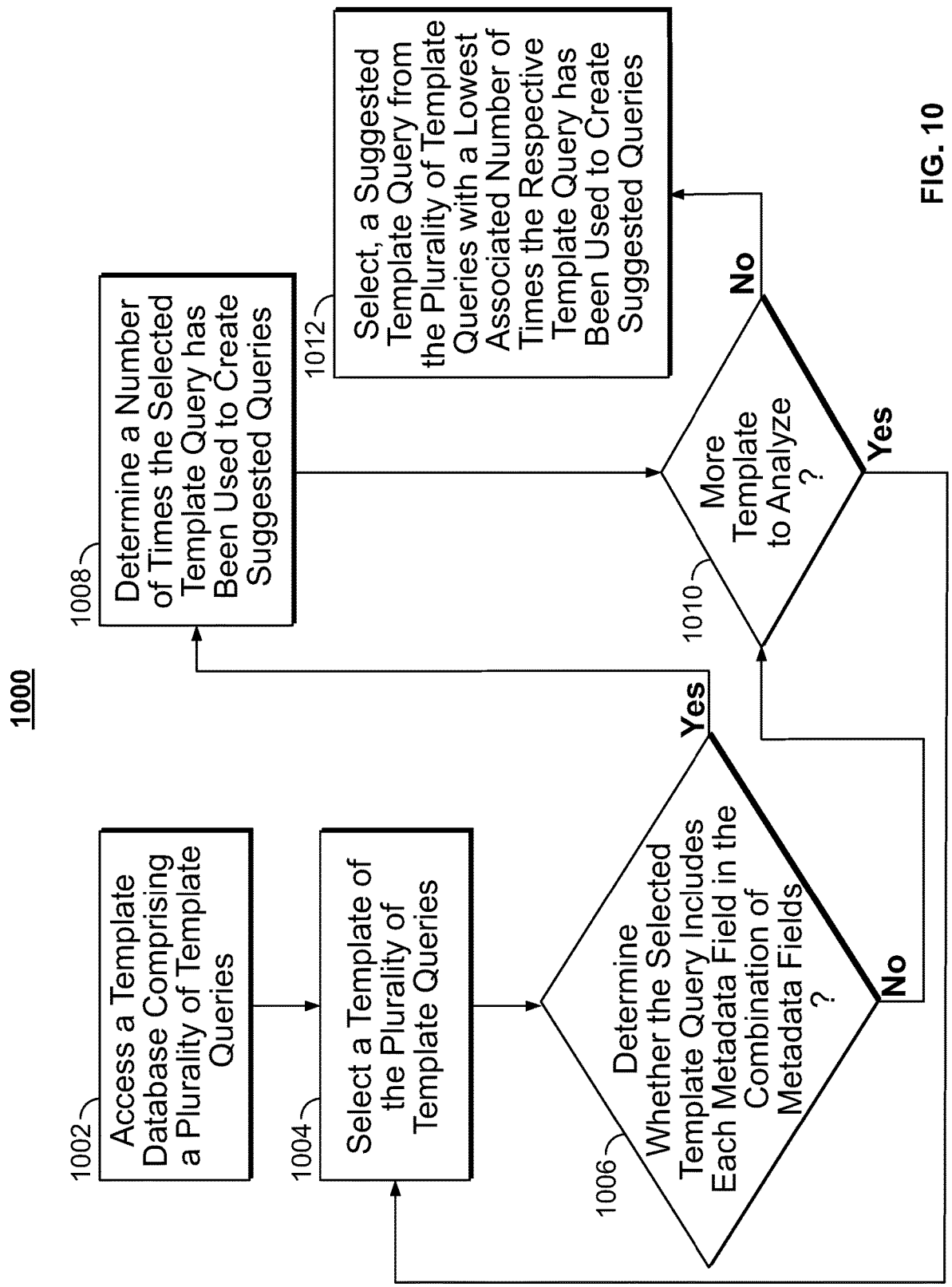
FIG. 10 is a flowchart of a detailed illustrative process for selecting a template query from a plurality of template queries to generate the suggested query, in accordance with some embodiments of the disclosure.

FIG. 10 is a flowchart of a detailed illustrative process for selecting a template query from a plurality of template queries to generate the suggested query, in accordance with some embodiments of the disclosure. It should be noted that process 1000 or any step thereof could be performed on, or provided by, any of the devices shown in FIGS. 2-3. For example, process 1000 may be executed by control circuitry 304 (FIG. 3) as instructed by a media system implemented on display 102 of user equipment device (which may have the functionality of any or all of user equipment 202, 204, and/or 206 (FIG. 2)). In addition, one or more steps of process 1000 may be incorporated into or combined with one or more steps of any other process or embodiment (e.g., as described in relation to FIGS. 4-9 and 11-13).

Process 1000 begins at 1002 where control circuitry (e.g., control circuitry 304) access a template database comprising a plurality of template queries. At 1004, control circuitry selects a template of the plurality of template queries. At decision block 1006, control circuitry determines whether the selected template query includes each metadata field in the combination of metadata fields. In response to determining that the selected template query includes each metadata field in the combination of metadata fields, control circuitry proceeds process 1000 to 1008 to determine a number of times the selected template query has been used to create suggested queries. In response to determining that the selected template query includes each metadata field in the combination of metadata fields, control circuitry proceeds process 1000 to decision block 1010 to determine if there are any more templates to analyze. In response to determining that there are more templates to analyze, control circuitry proceeds process 1000 to 1002 to select another template query from the plurality of template queries. In response to determining that there are no more templates to analyze, control circuitry proceeds process 1000 to 1012 to select, a suggested template query from the plurality of template queries with a lowest associated number of times the respective template query has been used to create suggested queries.

For example, the control circuitry may determine that the most commonly used template query by the user is a template query of the form "Start a movie by <director> released in <release date>". In this example, the control circuitry may not select this template query again for generating a suggested query to the user. In this example, the user is already aware of searching using the format of the template query, and the control circuitry may select a different template query that the user has not used often before, like "Show me <director> movies from <release date>".

Figure 11:
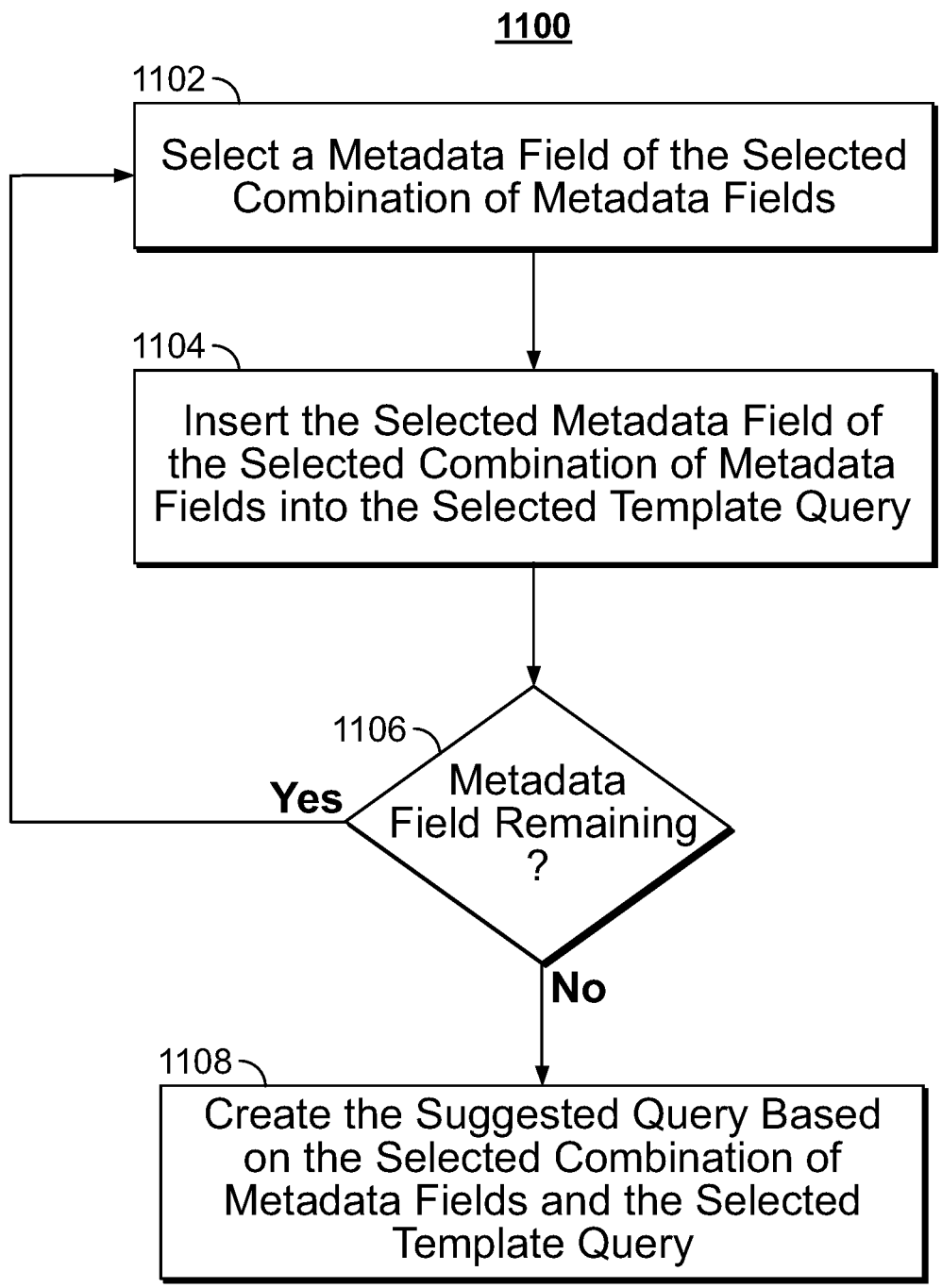
FIG. 11 is a flowchart of a detailed illustrative process for creating the suggested query based on the selected combination of metadata fields and template query, in accordance with some embodiments of the disclosure.

FIG. 11 is a flowchart of a detailed illustrative process for creating the suggested query based on the selected combination of metadata fields and template query, in accordance with some embodiments of the disclosure. It should be noted that process 1100 or any step thereof could be performed on, or provided by, any of the devices shown in FIGS. 2-3. For example, process 1100 may be executed by control circuitry 304 (FIG. 3) as instructed by a media system implemented on display 102 of user equipment device (which may have the functionality of any or all of user equipment 202, 204, and/or 206 (FIG. 2)). In addition, one or more steps of process 1100 may be incorporated into or combined with one or more steps of any other process or embodiment (e.g., as described in relation to FIGS. 4-10 and 12-13).

Process 1100 starts at 1102 where control circuitry (e.g., control circuitry 304) selects a metadata field of the selected combination of metadata field. At 1104, control circuitry inserts the selected metadata field of the selected combination of metadata fields into the selected template query. At decision block 1106, control circuitry determines whether a metadata field remains in the combination of metadata fields. In response to determining that a metadata field remains in the combination of metadata fields, control circuitry proceeds process 1100 to 1102 to select a metadata field of the selected combination of metadata field. In response to determining that no metadata field remains in the combination of metadata fields, control circuitry 304 proceeds process 1100 to 1108 to create the suggested query based on the selected combination of metadata fields and the selected template query.

For example, the control circuitry may select a template query "Show me a movie by <director_name> and released in <movie_release_date>" based on the metadata fields director and release date. In order to form a query based on the sample template query, the control circuitry inserts the relevant director's name in place of <director_name> tag and inserts the relevant release of date in place of <movie_release_date>. For example, for "The Dark Knight", released on Jul. 18, 2008 and directed by Christopher Nolan, the control circuitry may insert the name of the "Director" and the "Release Date" to generate the resulted query that looks like "Show me a movie by Christopher Nolan and released in 2018."

Figure 12:
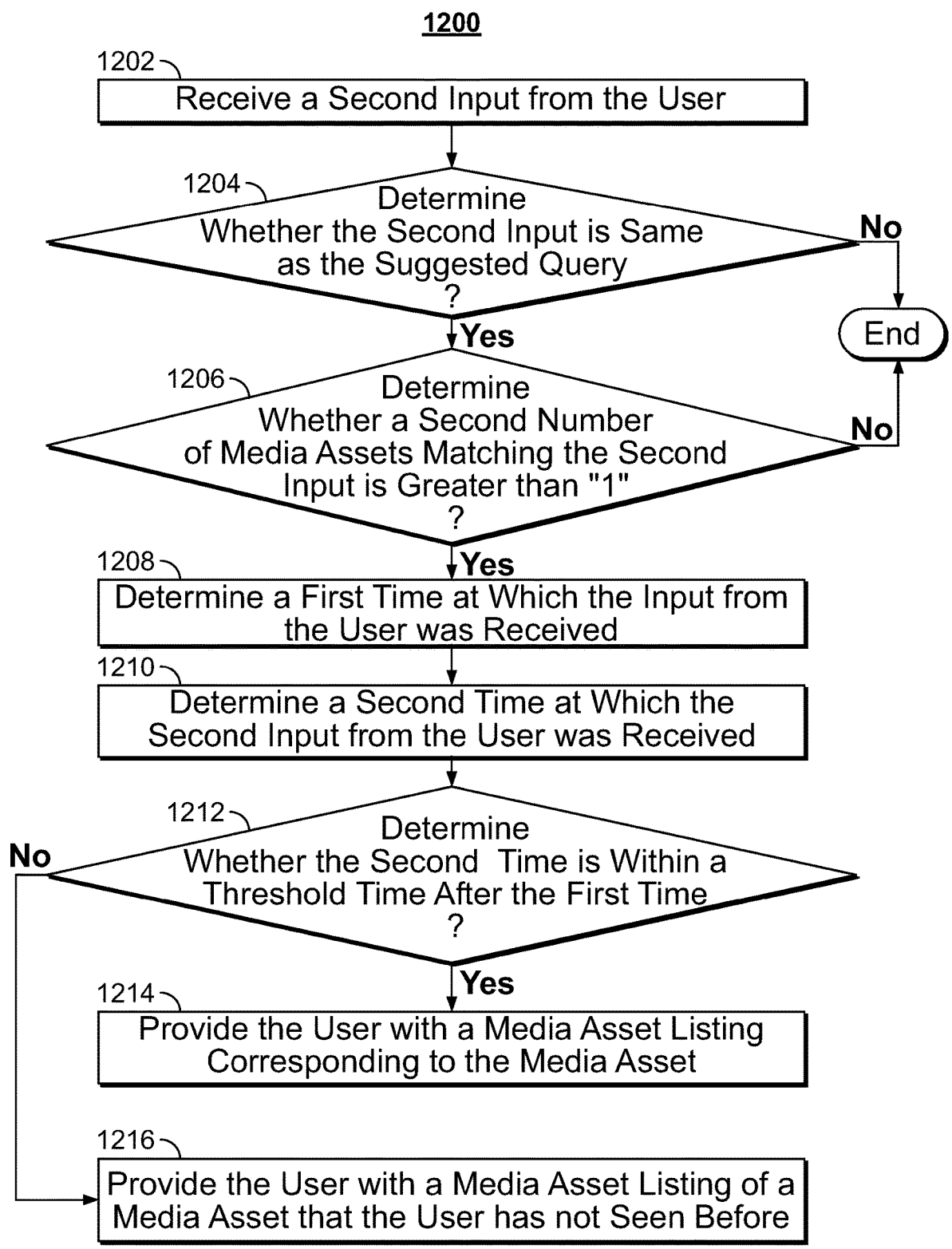
FIG. 12 is a flowchart of a detailed illustrative process for determining an output of the plurality of a second query, in accordance with some embodiments of the disclosure.

FIG. 12 is a flowchart of a detailed illustrative process for determining an output of the plurality of a second query, in accordance with some embodiments of the disclosure. It should be noted that process 1200 or any step thereof could be performed on, or provided by, any of the devices shown in FIGS. 2-3. For example, process 1200 may be executed by control circuitry 304 (FIG. 3) as instructed by a media system implemented on display 102 of user equipment device (which may have the functionality of any or all of user equipment 202, 204, and/or 206 (FIG. 2)). In addition, one or more steps of process 1200 may be incorporated into or combined with one or more steps of any other process or embodiment (e.g., as described in relation to FIGS. 4-11 and 13).

Process 1200 begins at 1202 where control circuitry (e.g., control circuitry 304) receives a second input from the user. In some embodiments, the second input, like the first input, may be received via text or voice depending on the device being used by the user to enter the input. The second input may be the same as the suggested query as the user may try to test out the suggested query.

At decision block 1204, control circuit 1204 determines whether the second input is same as the suggested query. In response to determining that the second input query is not the same as the suggested query, control circuitry 304 to process end. In response to determining that the second input is same as the suggested query, control circuitry 304 proceeds process 1200 at 1206 to determine whether a second number of media assets matching the second input is greater than one. In some embodiments, the comparison of the queries may include comparing the metadata fields used in the queries. For example, entering "Dark Knight" in a search bar and entering "Show me "Dark Knight" are considered the same queries by the control circuitry.

In response to determining that a second number of media assets matching the second input is greater than one, control circuitry proceeds process 1200 to 1208 to determine a first time at which the input from the user was received. In response to determining that a second number of media assets matching the second input is not greater than one, control circuitry proceeds process 1200 to end. At 1210, control circuitry determines a second time at which the second input from the user was received. At decision block 1212, control circuitry determines whether the second time is within a threshold time after the first time. In some embodiments, the user, upon being suggested a query, may test the suggested query provided by the media system by using it shortly after the query was suggested. In that case, the media system proceeds process 1200 to 1214 to provide the media asset listing corresponding to the media asset that was originally requested by the user.

For example, right after the user enters "The Dark Knight" in a search bar and selects a media asset listing related to "The Dark Knight", the control circuitry may provide a suggested query to the user "Show me movies by Christopher Nolan in 2008". If the control circuitry receives this input within a threshold time after the first input, the control circuitry will direct the user to the listing associated with "The Dark Knight". The threshold time may be defined by a user to be in terms of seconds (10, 20, 50, 120) or minutes (2 minutes, 5 minutes).

In response to determining that the second time is not within the threshold time after the first time, control circuitry proceeds process 1200 to 1216 to provide the user with a media asset listing of the media asset that the user has not seen before. For example, if the user provides the same query after the threshold time has passed, the control circuitry broadens the search and provides listings of media assets that the user has not seen before. An exemplary listing of such media assets may include movies that are directed by Christopher Nolan like "The Prestige", "Memento", "Batman Begins", "The Dark Knight" and movies that were released in 2008 like "Wall-E", "Mamma Mia", "Iron Man", and "The Incredible Hulk".

Figure 13:
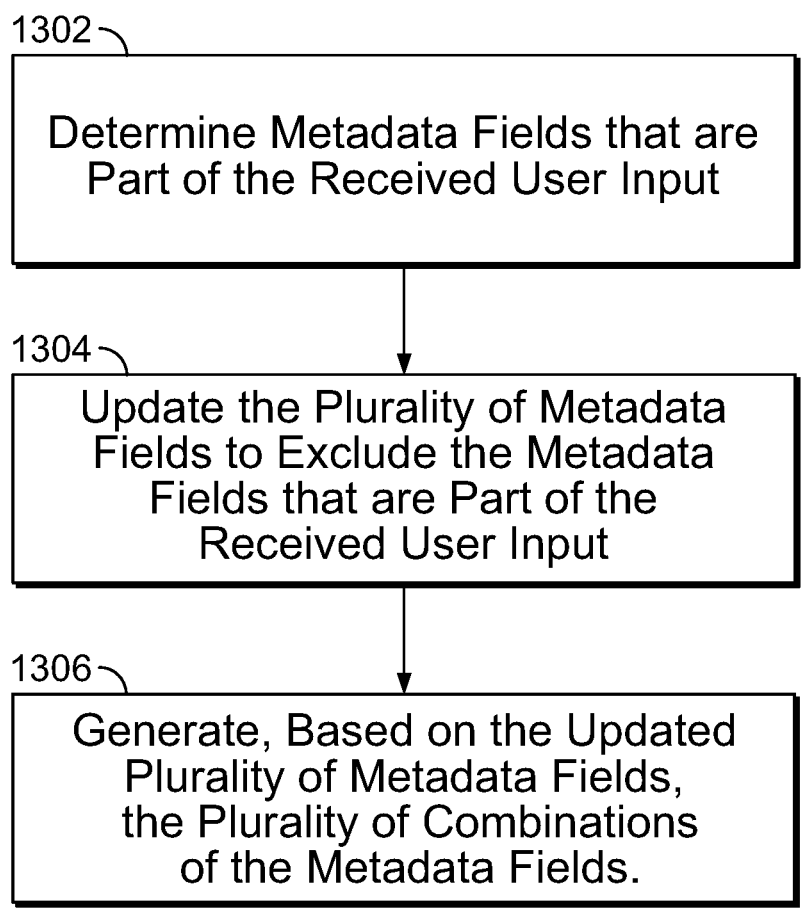
FIG. 13 is a flowchart of a detailed illustrative process for generating combinations of metadata fields, in accordance with some embodiments of the disclosure.

FIG. 13 is a flowchart of a detailed illustrative process for generating combinations of metadata fields, in accordance with some embodiments of the disclosure. It should be noted that process 1300 or any step thereof could be performed on, or provided by, any of the devices shown in FIGS. 2-3. For example, process 1300 may be executed by control circuitry 304 (FIG. 3) as instructed by a media system implemented on display 102 of user equipment device (which may have the functionality of any or all of user equipment 202, 204, and/or 206 (FIG. 2)). In addition, one or more steps of process 1300 may be incorporated into or combined with one or more steps of any other process or embodiment (e.g., as described in relation to FIGS. 4-12).

Process 1300 begins at 1302 where control circuitry (e.g., control circuitry 304) determines metadata fields that are part of the received user input. At 1304, control circuitry updates the plurality of metadata fields to exclude the metadata fields that are part of the received user input. At 1306, control circuitry generates, based on the updated plurality of combinations of the metadata fields. For example, the media system may exclude the "Title" field from the plurality of metadata fields that are used to generate the combinations of metadata fields because of the frequent use of the "Title" field by the user.

What is claimed is:

1. A method for generating query suggestions, the method comprising:
   receiving an input query from a user device associated with a user profile;
   in response to receiving the input query, retrieving search results generated based on the input query, the search results including a media asset;
   retrieving a plurality of metadata fields associated with the media asset;
   retrieving a plurality of combinations of the metadata fields generated based on the retrieved plurality of metadata fields;
   for each respective combination of the metadata fields of the plurality of combinations:
      (a) retrieving media assets searched from a database, the media assets that comprise comprising metadata fields matching the respective combination of the metadata fields; and
      (b) receiving a calculated number of media assets that match the respective combination based on the searching;
   receiving a least number of metadata fields that uniquely identifies the media asset, the least number comprising a number of metadata fields determined by:
      selecting a first metadata field; and
      in response to the first metadata field not uniquely identifying the media asset, incrementing the number of metadata fields by one until the number of metadata fields uniquely identifies the media asset;
   retrieving a metadata field identified as most frequently used in a plurality of input queries received in association with the user profile;
   receiving a selection of a combination of the metadata fields of the plurality of combinations selected such that the combination of metadata fields comprises the least number of metadata fields that uniquely identify the media asset and excludes the most frequently used metadata field;
   receiving a suggested query created based on the selected combination of metadata fields, wherein the suggested query does not comprise the input query and generates search results comprising the media asset when received as a later input query; and
   providing, simultaneously, the suggested query, the input query, and the media asset.

2. The method of claim 1, wherein searching the database for media assets further comprises:
   for each respective combination of the metadata fields and for each respective media asset in the database:
      determining whether metadata associated with the respective media asset includes the combination of the metadata fields; and
      in response to determining that the metadata associated with the respective media asset includes each metadata field in the combination of the metadata fields, incrementing the number of matching media assets associated with the respective combination by one.

3. The method of claim 1, wherein selecting the combination of the metadata fields further comprises:
   selecting the combination from the plurality of combinations where least number of metadata fields is equal to one.

4. The method of claim 1, further comprising:
   for each respective metadata field in the plurality of metadata fields:
      storing a title of the respective metadata field and a value associated with the title.

5. The method of claim 1, wherein generating a combination of metadata fields of the plurality of combinations further comprises:
   for each respective metadata field in the plurality of metadata fields: determining a different number of times the respective metadata field was part of a plurality of previously received inputs; and
   selecting, the metadata field with a different lowest associated number of times to be part of the combination of metadata fields.

6. The method of claim 1, wherein creating a suggested query further comprises:
   accessing a template database comprising a plurality of template queries; for each respective template query in the plurality of template queries:
      determining whether the respective template query includes each metadata field in the combination of metadata fields; and
      in response to determining that the respective template query includes each metadata field in the combination of metadata fields:
         determining a different number of times the respective template query has been used to create suggested queries; and
   selecting, a suggested template query from the plurality of template queries with a different lowest associated number of times the respective template query has been used to create suggested queries.

7. The method of claim 6, wherein creating the suggested query further comprises:
   generating the suggested query by modifying the suggested template query based on the selected combination of metadata fields.

8. The method of claim 1, further comprising:
   receiving a second input;
      determining that the second input is same as the suggested query;
      in response to determining that the second input is same as the suggested query:
         determining a second number of media assets matching the second input; and
         in response to determining that the second number of matching media assets to the second input is greater than one:
            determining a first time at which the input query was received;
            determining a second time at which the second input was received; and
            in response to determining that the second time is within a threshold time after the first time:
               providing a media asset listing corresponding to the media asset.

9. The method of claim 1, wherein generating the suggested query further comprises:
   determining metadata fields that are part of the received input; and
   wherein generating the plurality of combinations of the metadata fields comprises:

updating the plurality of metadata fields to exclude the metadata fields that are part of the received input; and generating, based on the updated plurality of metadata fields, the plurality of combinations of the metadata fields.

10. The method of claim 1, wherein outputting the suggested query further comprises:

generating a media asset listing corresponding to the media asset; and simultaneously generating for display, the suggested query.

11. The method of claim 1, wherein the first metadata field comprises a least recently used metadata field.

12. A system for generating query suggestions, the system comprising control circuitry configured to:

receive an input query from a user device associated with a user profile;

in response to receiving the input query, retrieve search results generated based on the input query, the search results including a media asset;

retrieve a plurality of metadata fields associated with the media asset;

retrieve a plurality of combinations of the metadata fields generated based on the retrieved plurality of metadata fields;

for each respective combination of the metadata fields of the plurality of combinations:

(a) retrieve media assets searched from a database, the media assets comprising metadata fields matching the respective combination of the metadata fields; and (b) receiving a calculated number of media assets that match the respective combination based on the searching;

receive a least number of metadata fields that uniquely identifies the media asset, the least number comprising a number of metadata fields determined by:

selecting a first metadata field; and in response to the first metadata field not uniquely identifying the media asset, incrementing the number of metadata fields by one until the number of metadata fields uniquely identifies the media asset;

retrieve a metadata field identified as most frequently used in a plurality of input queries received in association with the user profile;

retrieve a selection of a combination of the metadata fields of the plurality of combinations selected combination of metadata fields comprises the least number of metadata fields that uniquely identify the media asset and excludes the most frequently used metadata field;

receive a suggested query created based on the selected combination of metadata fields, wherein the suggested query does not comprise the input query and generates search results comprising the media asset when received as a later input query; and provide, simultaneously, the suggested query, the input query, and the media asset.

13. The system of claim 12, wherein the control circuitry, when searching the database for media assets is further configured to:

for each respective combination of the metadata fields and for each respective media asset in the database:

determine whether metadata associated with the respective media asset includes the combination of the metadata fields; and in response to determining that the metadata associated with the respective media asset includes each metadata field in the combination of the metadata fields, increment the number of matching media assets associated with the respective combination by one.

14. The system of claim 12, wherein the control circuitry, when selecting the combination of the metadata fields, is further configured to:

selecting the combination from the plurality of combinations where the least number of metadata fields is equal to one.

15. The system of claim 12, wherein the control circuitry is further configured to:

for each respective metadata field in the plurality of metadata fields:

store a title of the respective metadata field and a value associated with the title.

16. The system of claim 12, wherein the control circuitry, when generating a combination of metadata fields of the plurality of combinations, is further configured to:

for each respective metadata field in the plurality of metadata fields:

determine a different number of times the respective metadata field was part of a plurality of previously received inputs; and select, the metadata field with a different lowest associated number of times to be part of the combination of metadata fields.

17. The system of claim 12, wherein the control circuitry, when creating a suggested query, is further configured to:

access a template database comprising a plurality of template queries;

for each respective template query in the plurality of template queries:

determine whether the respective template query includes each metadata field in the combination of metadata fields; and in response to determining that the respective template query includes each metadata field in the combination of metadata fields:

determine a different number of times the respective template query has been used to create suggested queries; and select, a suggested template query from the plurality of template queries with a different lowest associated number of times the respective template query has been used to create suggested queries.

18. The system of claim 17, wherein the control circuitry, when creating the suggested query, is further configured to:

generate the suggested query by modifying the suggested template query based on the selected combination of metadata fields.

19. The system of claim 12, wherein the control circuitry is further configured to:

receive a second input;

determine that the second input is same as the suggested query;

in response to determining that the second input is same as the suggested query:

determine a second number of media assets matching the second input; and in response to determining that the second number of matching media assets to the second input is greater than one:

determine a first time at which the input query was received;

determine a second time at which the second input was received; and in response to determining that the second time is within a threshold time after the first time:

provide a media asset listing corresponding to the media asset.

20. The system of claim 12, wherein the control circuitry, when generating the suggested query, is further configured to:

determine metadata fields that are part of the received input; and wherein generating the plurality of combinations of the metadata fields comprises:

update the plurality of metadata fields to exclude the metadata fields that are part of the received input; and generate, based on the updated plurality of metadata fields, the plurality of combinations of the metadata fields.

21. The system of claim 12, wherein the control circuitry, when outputting the suggested query, is further configured to:

generate a media asset listing corresponding to the media asset; and simultaneously generate for display, the suggested query.

22. A non-transitory computer readable medium comprising instructions for generating query suggestions, that when executed causes control circuitry to:

receive an input query from a user device associated with a user profile;

in response to receiving the input query, retrieve search results generated based on the input query, the search results including a media asset;

retrieve a plurality of metadata fields associated with the media asset;

retrieve a plurality of combinations of the metadata fields generated based on the retrieved plurality of metadata fields;

for each respective combination of the metadata fields of the plurality of combinations:

(a) retrieve media assets searched from a database, the media assets that comprise comprising metadata fields matching the respective combination of the metadata fields; and (b) receive a calculated number of media assets that match the respective combination based on the searching;

receive a least number of metadata fields that uniquely identifies the media asset, the least number comprising a number of metadata fields determined by:

selecting a first metadata field; and in response to the first metadata field does not uniquely identifying the media asset, incrementing the number of metadata fields by one until the number of metadata fields uniquely identifies the media asset;

retrieve a metadata field identified as most frequently used in a plurality of input queries received in association with the user profile;

receive a selection of a combination of the metadata fields of the plurality of combinations selected such that the combination of metadata fields comprises the least number of metadata fields that uniquely identify the media asset and excludes the most frequently used metadata field;

receive a suggested query created based on the selected combination of metadata fields, wherein the suggested query does not comprise the input query and generates search results comprising the media asset when received as a later input query; and provide, simultaneously, the suggested query, the input query, and the media asset.

23. The non-transitory computer readable medium of claim 22, further comprising instructions that when executed by the control circuitry causes the control circuitry to search the database for media assets by:

for each respective combination of the metadata fields and for each respective media asset in the database:

determining whether metadata associated with the respective media asset includes the combination of the metadata fields; and in response to determining that the metadata associated with the respective media asset includes each metadata field in the combination of the metadata fields, incrementing the number of matching media assets associated with the respective combination by one.

24. The non-transitory computer readable medium of claim 22, further comprising instructions that when executed by the control circuitry causes the control circuitry to select the combination of the metadata fields, by:

selecting the combination from the plurality of combinations where the least number of metadata fields is equal to one.

25. The non-transitory computer readable medium of claim 22, further comprising instructions that when executed by the control circuitry causes the control circuitry to:

for each respective metadata field in the plurality of metadata fields:

store a title of the respective metadata field and a value associated with the title.

26. The non-transitory computer readable medium of claim 22, further comprising instructions that when executed by the control circuitry causes the control circuitry to generate a combination of metadata fields of the plurality of combinations, by:

for each respective metadata field in the plurality of metadata fields: determining a different number of times the respective metadata field was part of a plurality of previously received inputs; and selecting, the metadata field with a different lowest associated number of times to be part of the combination of metadata fields.

27. The non-transitory computer readable medium of claim 22, further comprising instructions that when executed by the control circuitry causes the control circuitry to create a suggested query, by:

accessing a template database comprising a plurality of template queries;

for each respective template query in the plurality of template queries:

determining whether the respective template query includes each metadata field in the combination of metadata fields; and in response to determining that the respective template query includes each metadata field in the combination of metadata fields:

determining a different number of times the respective template query has been used to create suggested queries; and selecting, a suggested template query from the plurality of template queries with a different lowest associated number of times the respective template query has been used to create suggested queries.

28. The non-transitory computer readable medium of claim 27, further comprising instructions that when executed by the control circuitry causes control circuitry to create the suggested query, by:

generating the suggested query by modifying the suggested template query based on the selected combination of metadata fields.

29. The non-transitory computer readable medium of claim 22, further comprising instructions that when executed by the control circuitry causes control circuitry to:

receive a second input;

determine that the second input is same as the suggested query;

in response to determining that the second input is same as the suggested query:

determine a second number of media assets matching the second input; and in response to determining that the second number of matching media assets to the second input is greater than one:

determine a first time at which the input query was received;

determine a second time at which the second input was received; and in response to determining that the second time is within a threshold time after the first time:

provide a media asset listing corresponding to the media asset.

30. The non-transitory computer readable medium of claim 27, further comprising instructions that when executed by the control circuitry causes the control circuitry to generate the suggested query, by:

determining metadata fields that are part of the received input; and wherein generating the plurality of combinations of the metadata fields comprises:

updating the plurality of metadata fields to exclude the metadata fields that are part of the received input; and generating, based on the updated plurality of metadata fields, the plurality of combinations of the metadata fields.

31. A method for generating query suggestions, the method comprising:

receiving an input query from a user device associated with a user profile, the input query comprising at least one input metadata field;

in response to receiving the input query, retrieving search results generated based on the input query, the search results including a content item;

retrieving a plurality of metadata fields associated with the content item, wherein the plurality of metadata fields do not comprise the at least one input metadata field;

retrieving a plurality of combinations of the metadata fields generated based on the retrieved plurality of metadata fields;

for each respective combination of the metadata fields of the plurality of combinations:

(a) retrieving content items searched from a database, the searched content items that comprise comprising metadata fields matching the respective combination of the metadata fields; and (b) receiving a determined number of content items that match the respective combination based on the searching;

receiving a least number of metadata fields that uniquely identifies the content item, the least number comprising a number of metadata fields determined by:

selecting a first metadata field; and in response to the first metadata field not uniquely identifying the media asset, incrementing the number of metadata fields by one until the number of metadata fields uniquely identifies the media asset;

retrieving a metadata field identified as most frequently used in a plurality of input queries received in association with the user profile;

receiving a selection of a combination of the metadata fields of the plurality of combinations selected such that the combination of metadata fields comprises the least number of metadata fields that uniquely identify the content item and excludes the most frequently used metadata field;

receiving a suggested query generated based on the selected combination of metadata fields, wherein the suggested query generates search results comprising the content item when received as a later input query; and providing the suggested query.

* * * * *